(12) United States Patent
Mitsuo et al.

(10) Patent No.: US 7,734,169 B2
(45) Date of Patent: Jun. 8, 2010

(54) CAMERA

(75) Inventors: Teruhisa Mitsuo, Ome (JP); Yasuharu Yamada, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 421 days.

(21) Appl. No.: 11/648,937

(22) Filed: Jan. 2, 2007

(65) Prior Publication Data
US 2007/0160362 A1 Jul. 12, 2007

(30) Foreign Application Priority Data

Jan. 10, 2006 (JP) ............................. 2006-002775
Jan. 20, 2006 (JP) ............................. 2006-012742

(51) Int. Cl.
*G03B 13/02* (2006.01)
(52) U.S. Cl. ...................................... 396/373; 359/431
(58) Field of Classification Search ................. 396/373, 396/382, 385; 359/431
See application file for complete search history.

(56) References Cited

U.S. PATENT DOCUMENTS

| | | | | |
|---|---|---|---|---|
| 5,648,835 A | * | 7/1997 | Uzawa | 396/429 |
| 5,790,313 A | * | 8/1998 | Kanai | 359/645 |
| 5,953,546 A | * | 9/1999 | Okada et al. | 396/272 |
| 6,233,097 B1 | * | 5/2001 | Mihara | 359/633 |
| 6,646,814 B2 | * | 11/2003 | Uzawa et al. | 359/687 |
| 6,747,817 B2 | * | 6/2004 | Takato | 359/794 |
| 7,400,827 B2 | * | 7/2008 | Kawai et al. | 396/272 |
| 2002/0063970 A1 | * | 5/2002 | Uzawa et al. | 359/689 |

FOREIGN PATENT DOCUMENTS

| JP | 09-005866 | 1/1997 |
|---|---|---|
| JP | 2000-165730 | 6/2000 |

OTHER PUBLICATIONS

Machine translation JP 2000-165730.*

* cited by examiner

*Primary Examiner*—Christopher E Mahoney
*Assistant Examiner*—Linda B Smith
(74) *Attorney, Agent, or Firm*—Kenyon & Kenyon LLP

(57) ABSTRACT

There is disclosed a camera having a first imaging medium which acquires subject image data from a subject light flux transmitted through a photographing lens; an optical path branching member which is disposed in an image pickup optical path of the first imaging medium to branch an optical path of the subject light flux; a primary image forming surface on which the subject light flux branched by the optical path branching member forms an image; and a second imaging medium which picks up the subject image formed on the primary image forming surface. When the present camera satisfies at least one of a plurality of optical conditions, the amount of shading of the light flux guided to the second imaging medium is reduced.

16 Claims, 14 Drawing Sheets

CAMERA

CROSS-REFERENCE TO RELATED APPLICATION

This application is based upon and claims the benefit of priority from prior Japanese Patent Application Nos. 2006-002775, filed on Jan. 10, 2006, and 2006-012742, filed on Jan. 20, 2006, the entire contents of which are incorporated herein by reference.

BACKGROUND OF THE INVENTION

1. Field of the Invention

The present invention relates to a camera including a plurality of imaging mediums (image sensors (CCD, CMOS), films or the like) to which an incoming light flux from a subject (an incoming subject light flux) is guided.

2. Description of the Related Art

Cameras including a plurality of imaging mediums to which an incoming subject light flux is guided have heretofore been known. Examples of the plurality of imaging mediums include one for photographing a subject and one for monitoring a subject image before photographing. These cameras branch or refract a subject light flux incoming from a photographing lens system to guide the fluxes to the plurality of imaging mediums by use of optical systems such as a quick return mirror, a half mirror and a prism.

As this type of camera, there are proposed cameras described in, for example, Jpn. Pat. Appln. KOKAI Publication Nos. 9-5866 and 2000-165730 described later.

In the camera described in Jpn. Pat. Appln. KOKAI Publication No. 9-5866, a light flux incoming from a subject and transmitted through a photographing lens is divided by a half mirror (an optical path branching member) disposed midway in an optical path for photographing by film so that another optical path is formed in a direction different from that of the film. Moreover, a mirror or a prism (an optical path refracting member) is disposed in the optical path branched in the direction different from that of the film to bend the light flux, and an image sensor is disposed in the bent optical path.

In the camera described in Jpn. Pat. Appln. KOKAI Publication No. 2000-165730, a quick return mirror (a first optical path change member) is disposed midway in an optical path for picking up a light flux incoming from a subject and transmitted through a photographing lens to a first image sensor so that the optical path can also be switched in a direction different from that of the first image sensor. Moreover, in the optical path switched to the direction different from that of the first image sensor, a movable mirror (a second optical path change member) is disposed which can switch the direction of the optical path between the direction of a second image sensor and that of an optical finder. In the optical paths switched by the second optical path change member, the second image sensor and the optical finder are provided, respectively.

BRIEF SUMMARY OF THE INVENTION

A camera of the present invention has: a first imaging medium which acquires subject image data from a subject light flux transmitted through a photographing lens; an optical path branching member which is disposed in an image pickup optical path of the first imaging medium to branch an optical path of the subject light flux; a primary image forming surface on which the subject light flux branched by the optical path branching member forms an image; a second imaging medium which picks up the subject image formed on the primary image forming surface; and a secondary image forming optical system which projects the subject image formed on the primary image forming surface onto the second imaging medium. Moreover, the camera of the present invention satisfies at least one of the following conditions 1 to 5.

Condition 1: The camera has a finder optical system which is disposed in an optical path in a direction different from that of the first imaging medium and through which the subject image formed on the primary image forming surface is observed. Moreover, the camera satisfies the following equation (1):

$$|TAN^{-1}(OBJH/ENP1) - TAN^{-1}(OBJH/ENP2)| \leq 20° \quad (1),$$

in which ENP1 is a distance from the incidence pupil of the secondary image forming optical system to the subject image formed on the primary image forming surface along an optical axis, and ENP2 is a distance from the incidence pupil of the finder optical system to the subject image formed on the primary image forming surface along the optical axis. Here, it is set that an eye point of the finder optical system is disposed at an arbitrary position in a range of 0 to 50 mm from the last surface of the finder optical system toward an observation side. Moreover, OBJH is the maximum effective ray height on the primary image forming surface.

Condition 2: The secondary image forming optical system has at least one positive lens and one negative lens. Moreover, the camera satisfies the following equation (2):

$$10 \leq vp - vn \quad (2),$$

in which vp is the Abbe number in a d-line of the positive lens among the lenses constituting the secondary image forming optical system, and vn is the Abbe number in a d-line of the negative lens among the lenses constituting the secondary image forming optical system.

Condition 3: The secondary image forming optical system has at least two positive lenses. Moreover, the camera satisfies the following equation (3):

$$50 \leq vpmx \quad (3),$$

in which vpmx is the Abbe number in the d-line of the positive lens having the largest power among the lenses constituting the secondary image forming optical system.

Condition 4: The camera has: a photometry member which detects brightness of the subject image formed on the primary image forming surface; and a photometry optical system which guides, to the photometry member, a light flux emitted from the subject image formed on the primary image forming surface. Moreover, the camera satisfies the following equation (4):

$$0.5 \leq ENP1/EPAE \leq 1.7 \quad (4),$$

in which ENP1 is a distance from the primary image forming surface to the incidence pupil of the secondary image forming optical system, and EPAE is a distance from the primary image forming surface to an incidence pupil of the photometry optical system.

Condition 5: The camera has: a finder optical system disposed in an optical path branched by the optical path branching member to observe the subject image formed on the primary image forming surface and having a plurality of reflective members; a photometry member which detects brightness of the subject image formed on the primary image forming surface; and a photometry optical system which guides, to the photometry member, a light flux emitted from the subject image formed on the primary image forming surface. Moreover, the camera satisfies the following equation (5):

$$|EPAE-MSL| \leq 20 \tag{5},$$

in which EPAE is a distance from the primary image forming surface to the incidence pupil of the photometry optical system, and MSL is a distance from the primary image forming surface to a reflective surface of the reflective member having the largest paraxial distance from the primary image forming surface.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

Figure 1:
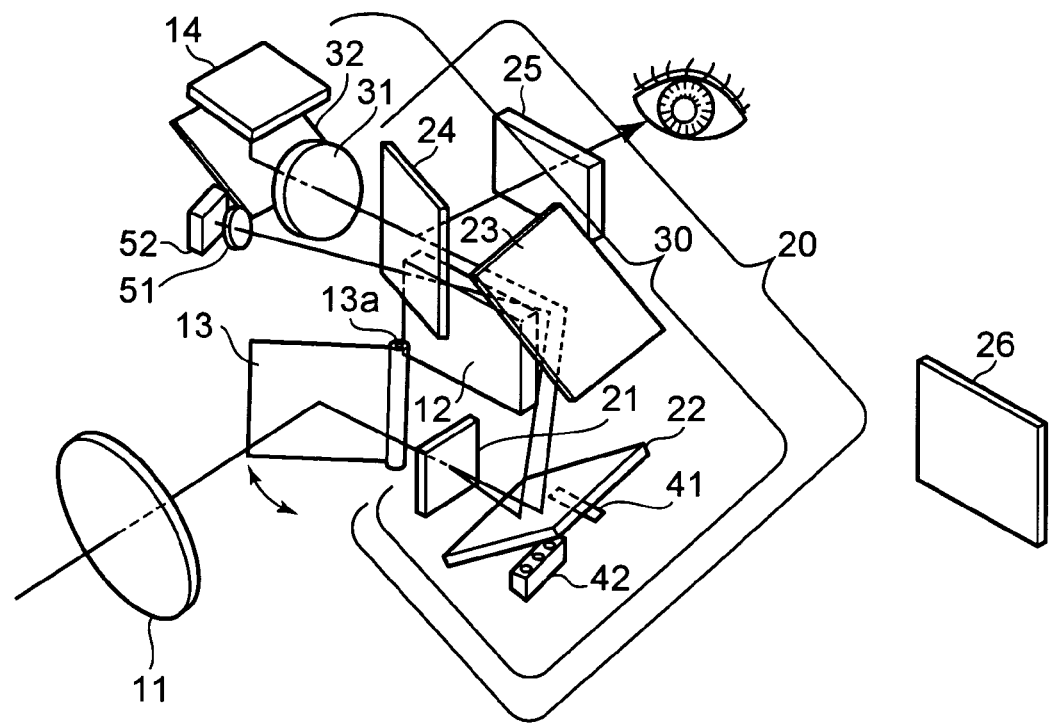
FIG. 1 is a schematic constitution diagram showing an arrangement relation between optical members during subject observation before photographing in a camera according to a first embodiment of the present invention.

Preferred embodiments of the invention are described below with reference to the accompanying drawings.

Prior to the description of the embodiments, functions and effects of the embodiments will be described.

In the following embodiments, in a camera including a plurality of imaging mediums to which an incoming subject light flux is guided, there is an effect of reducing shading of the light flux guided to the imaging medium (e.g., an image sensor for monitoring a subject image) different from a main imaging medium for photographing the subject image.

A first camera of the present embodiment includes a first imaging medium which picks up a subject image from a subject light flux transmitted through a photographing lens; an optical path branching member constituted so that the subject light flux can be guided to an optical path directed to the first imaging medium and another optical path in a direction different from that of the first imaging medium, at a position on an optical path between the photographing lens and the first imaging medium; a finder optical system disposed in the optical path in the direction different from that of the first imaging medium; a primary image forming surface which is disposed on or in the vicinity of an optical surface of an optical elements within the finder optical system and on which the subject image derived from the subject light flux reflected via the optical path branching member is formed; a second imaging medium which is disposed in an optical path branched in a direction deviating from the optical path of the finder optical system at the middle thereof and which picks up the subject image formed on the primary image forming surface; a secondary image forming optical system which projects the subject image formed on the primary image forming surface onto the second imaging medium; and a subject image display member capable of displaying the subject image picked up via the first or second imaging medium. Moreover, the camera is characterized in that the following condition equation (1) is satisfied:

$$|TAN^{-1}(OBJH/ENP1) - TAN^{-1}(OBJH/ENP2)| \leq 20° \quad (1),$$

in which ENP1 is a distance from the incidence pupil of the secondary image forming optical system to the subject image formed on the primary image forming surface along the optical axis, and ENP2 is a distance from the incidence pupil of the finder optical system to the subject image formed on the primary image forming surface along the optical axis. Here, it is set that an eye point of the finder optical system has an arbitrary value in a range of 0 to 50 mm from the last surface of the finder optical system toward an observation side. Moreover, OBJH is the maximum effective ray height on the primary image forming surface.

Above the upper limit value of the above condition equation (1), there is an excessively large difference between the incidence pupil position of the finder optical system and the incidence pupil position of the secondary image forming optical system for the projection on the second imaging medium. In this case, in the subject image observed via the finder or the subject image picked up via the second imaging medium, the shading of rays or a remarkable drop of a quantity of peripheral light may easily occur in a screen peripheral portion. Therefore, a practical problem such like a hindrance of an observation using the optical finder or a liquid crystal view finder may easily occur.

It is to be noted that it is preferable to constitute the present first camera so that all or a part of the secondary image forming optical system is used also as an optical member constituting the finder optical system.

In this case, the number of the optical members constituting the whole camera can be reduced, and miniaturization and cost reduction of a camera housing can be realized.

Moreover, in the present first camera, it is preferable that the secondary image forming optical system has at least one positive lens and one negative lens and that the following condition equation (2) is satisfied:

$$10 \leq \nu p - \nu n \quad (2),$$

in which $\nu p$ is the Abbe number in a d-line of the positive lens among the lenses constituting the secondary image forming optical system, and $\nu n$ is the Abbe number in a d-line of the negative lens among the lenses constituting the secondary image forming optical system.

Below the lower limit value of the condition equation (2), an achromatic effect produced by the positive and negative lenses decreases. Therefore, chromatic aberrations increase, and it becomes difficult to obtain a sufficiently necessary resolution corresponding to a pixel pitch of, for example, the image sensor for monitor display as the second imaging medium.

Moreover, in the present first camera, it is preferable that the secondary image forming optical system has at least two positive lenses and that the following condition equation (3) is satisfied:

$$50 \leq \nu pmx \quad (3),$$

in which $\nu pmx$ is the Abbe number in the d-line of the positive lens having the largest power among the lenses constituting the secondary image forming optical system.

Below the lower limit value of the condition equation (3), dispersion by the positive lens having the largest power increases. Therefore, the chromatic aberrations increase, and it becomes difficult to obtain the sufficiently necessary resolution corresponding to the pixel pitch of, for example, the image sensor for monitor display as the second imaging medium.

Moreover, in the present first camera, it is preferable that the secondary image forming optical system includes at least one or more plastic lenses.

In a case where the plastic lens is used, it is possible to inexpensively secure a sufficiently necessary performance as compared with a case where a glass lens is used.

Furthermore, in the present first camera, it is preferable that the secondary image forming optical system includes at least one or more aspherical lenses.

When the aspherical lens is used, it is possible to secure a sufficiently necessary performance with the small number of the lenses, and the miniaturization and cost reduction of the camera housing can therefore be realized.

In addition, in the present first camera, it is preferable that the image sensor for use in the second imaging medium is smaller than that for use in the first imaging medium.

When the small image sensor is used, a light flux can be reduced in size, and the camera can be miniaturized.

Moreover, when the small image sensor is used, power consumption can be suppressed. This constitution is advantageous in increasing the number of images which can be photographed as much as possible.

Furthermore, a magnification of the secondary image forming optical system becomes less than 1, a principal point position of the secondary image forming optical system can be brought toward a second imaging medium side, and an advantageous layout is realized. For example, it is easy to dispose a lens element such as an image pickup lens for forming the subject image on the second imaging medium in the optical path branched from that of the finder optical system.

In addition, it is preferable that the present first camera includes a photographing information display member and a focused portion display member as a part of common optical elements constituting the finder optical system and the secondary image forming optical system.

According to such a constitution, the subject image data formed on the primary image forming surface is confirmed via the finder optical system and the secondary image forming optical system. Moreover, it is possible to confirm information such as a shutter speed and F-number_(Fno.) and a focused portion via the photographing information display member and the focused portion display member, respectively.

Moreover, in the present first camera, it is preferable that at least one of a surface having a condensing function and a mat surface is disposed in parallel with the primary image forming surface on or in the vicinity of the primary image forming surface and that the following condition equation (1') is satisfied:

$$|TAN^{-1}(OBJH/ENP1) - TAN^{-1}(OBJH/ENP2)| \geq 15° \quad (1'),$$

in which ENP1 is a distance from the incidence pupil of the secondary image forming optical system to the subject image formed on the primary image forming surface along the optical axis, and ENP2 is a distance from the incidence pupil of the finder optical system to the subject image formed on the primary image forming surface along the optical axis. Here, it is set that the eye point of the finder optical system has an arbitrary value in a range of 0 to 50 mm from the last surface of the finder optical system toward the observation side.

Moreover, OBJH is the maximum effective ray height on the primary image forming surface.

When the surface having the condensing function is disposed in parallel with the primary image forming surface on or in the vicinity of the primary image forming surface, aberration fluctuations can be minimized. Moreover, the subject light flux is refracted toward the incidence pupils of the finder optical system and the secondary image forming optical system, and the shading of the rays or the remarkable drop of the quantity of the peripheral light can be prevented in the screen peripheral portion of the image data acquired by the finder and the second imaging medium.

Furthermore, when the mat surface is disposed in parallel with the primary image forming surface on or in the vicinity of the primary image forming surface, deterioration of the subject image due to diffusion can be minimized. Moreover, the subject light flux strikes on the incidence pupils of the finder optical system and the secondary image forming optical system owing to the diffusion of the mat surface, and the shading of the rays or the remarkable drop of the quantity of the peripheral light can be prevented in the screen peripheral portion of the image data acquired by the finder and the second imaging medium.

In addition, if the above condition equation (1') is satisfied, a difference between the incidence pupil positions of the finder optical system and that of each optical system related to the second imaging medium is reduced. Therefore, even if the subject light flux is influenced by the refraction on the surface having the condensing function or the diffusion on the mat surface, the shading of the rays or the remarkable drop of the quantity of the peripheral light can be prevented in the screen peripheral portion of the image data acquired by the finder and the second imaging medium.

Moreover, in the present first camera, it is preferable that the finder optical system and the secondary image forming optical system include a plurality of optical reflective surfaces and that some of the plurality of optical reflective surfaces have a light transmitting property.

According to such a constitution, the subject image inverted by the photographing lens can be formed into an erected image via the optical path branching member and the plurality of optical reflective surfaces. When some of the plurality of optical reflective surfaces is provided with the light transmitting property, the finder optical system and the second imaging medium can share one optical path and separate the one optical path into two in midway so that the finder optical system and the second imaging medium can compactly be arranged.

Furthermore, a second camera includes a first imaging medium which picks up a subject image from a subject light flux transmitted through a photographing lens; an optical path branching member constituted so that the subject light flux can be guided to an optical path directed to the first imaging medium and another optical path in a direction different from that of the first imaging medium at a position in the middle of an optical path between the photographing lens and the first imaging medium; a primary image forming surface which is disposed on or in the vicinity of an optical surface of an optical element arranged in the optical path in the direction different from that of the first imaging medium and on which the subject image derived from the subject light flux reflected via the optical path branching member is formed; a second imaging medium which picks up the subject image formed on the primary image forming surface; and a subject image display member capable of displaying the subject image picked up via the first or second imaging medium. Moreover, the camera is characterized in that a secondary image forming optical system which projects the image on the primary image forming surface onto the second imaging medium has at least one positive lens and one negative lens and that the following condition equation (2) is satisfied:

$$10 \geq \nu p - \nu n \qquad (2),$$

in which $\nu p$ is the Abbe number in a d-line of the positive lens among the lenses constituting the secondary image forming optical system, and $\nu n$ is the Abbe number in a d-line of the negative lens among the lenses constituting the secondary image forming optical system.

Below the lower limit value of the condition equation (2), an achromatic effect produced by the positive and negative lenses decreases. Therefore, chromatic aberrations increase, and it becomes difficult to obtain a sufficiently necessary resolution corresponding to a pixel pitch of, for example, an image sensor for monitor display as the second imaging medium.

Moreover, in the present second camera, it is preferable that the secondary image forming optical system includes at least one or more plastic lenses.

In a case where the plastic lens is used, it is possible to inexpensively secure a sufficiently necessary performance as compared with a case where a glass lens is used.

Furthermore, in the present second camera, it is preferable that the secondary image forming optical system includes at least one or more aspherical lenses.

When the aspherical lens is used, it is possible to secure a sufficiently necessary performance with the small number of the lenses, and miniaturization and cost reduction of a camera housing can therefore be realized.

In addition, in the present second camera, it is preferable that the image sensor for use in the second imaging medium is smaller than that for use in the first imaging medium.

When the small image sensor is used, a light flux can be reduced in size, and the camera can be miniaturized. When the small image sensor is used, power consumption can be suppressed. This constitution is advantageous in increasing the number of images which can be photographed as much as possible.

In addition, it is preferable that the present second camera includes a photographing information display member and a focused portion display member as a part of optical members constituting the secondary image forming optical system.

According to such a constitution, subject image data formed on the primary image forming surface is confirmed via the secondary image forming optical system. Moreover, it is possible to confirm optical information via the photographing information display member and confirm a focused portion via the focused portion display member.

Moreover, in the present second camera, it is preferable that at least one of a surface having a condensing function and a mat surface is disposed in parallel with the primary image forming surface on or in the vicinity of the primary image forming surface.

When the surface having the condensing function is disposed in parallel with the primary image forming surface on or in the vicinity of the primary image forming surface, aberration fluctuations can be minimized. Moreover, the subject light flux is refracted so as to be directed toward each incidence pupil of the secondary image forming optical system, and shading of rays or a remarkable drop of a quantity of peripheral light can be prevented in a screen peripheral portion of the image data acquired by the second imaging medium.

Furthermore, when the mat surface is disposed in parallel with the primary image forming surface in the vicinity of the primary image forming surface, deterioration of the subject image due to diffusion can be minimized. Moreover, the subject light flux strikes on the incidence pupil of the secondary image forming optical system owing to diffusion of the mat surface, and the shading of the rays or the remarkable drop of the quantity of the peripheral light can be prevented in the screen peripheral portion of the image data acquired by the second imaging medium.

In addition, in the present second camera, it is preferable that the secondary image forming optical system includes a plurality of optical reflective surfaces.

According to such a constitution, for example, the optical path can arbitrarily be bent using a mirror or a prism to compactly dispose the second imaging medium, and the camera housing can be miniaturized.

Moreover, a third camera includes a first imaging medium which picks up a subject image from a subject light flux transmitted through a photographing lens; an optical path branching member constituted so that the subject light flux can be guided to an optical path directed to the first imaging medium and another optical path in a direction different from that of the first imaging medium at a position in the optical path between the photographing lens and the first imaging medium; a primary image forming surface which is an optical surface of a optical element arranged in the optical path in the direction different from that of the first imaging medium and on which the subject image derived from the subject light flux reflected via the optical path branching member is formed; a second imaging medium which picks up the subject image formed on the primary image forming surface; and a subject image display member capable of displaying the subject image picked up via the first or second imaging medium. Moreover, the camera is characterized in that a secondary image forming optical system which projects the image on the primary image forming surface onto the second imaging medium has at least two positive lenses and that the following condition equation (3) is satisfied:

$$50 \leq vpmx \qquad (3),$$

in which vpmx is the Abbe number in a d-line of the positive lens having the largest power among the lenses constituting the secondary image forming optical system.

Below the lower limit value of the above condition equation (3), dispersion by the positive lens having the largest power increases. Therefore, chromatic aberrations increase, and it becomes difficult to obtain a sufficiently necessary resolution corresponding to a pixel pitch of, for example, an image sensor for monitor display as the second imaging medium.

Moreover, in the present third camera, it is preferable that the secondary image forming optical system includes at least one or more plastic lenses.

In a case where the plastic lens is used, it is possible to inexpensively secure a sufficiently necessary performance as compared with a case where a glass lens is used.

Furthermore, in the present third camera, it is preferable that the secondary image forming optical system includes at least one or more aspherical lenses.

When the aspherical lens is used, it is possible to secure a sufficiently necessary performance with the small number of the lenses, and miniaturization and cost reduction of a camera housing can therefore be realized.

In addition, in the present third camera, it is preferable that the image sensor for use in the second imaging medium is smaller than that for use in the first imaging medium.

When the small image sensor is used, a light flux can be reduced in size, and the camera can be miniaturized. Moreover, when the small image sensor is used, power consumption can be suppressed. This constitution is advantageous in increasing the number of images which can be photographed as much as possible.

Furthermore, it is preferable that the present third camera includes a photographing information display member and a focused portion display member as a part of optical members constituting the secondary image forming optical system.

According to such a constitution, subject image data formed on the primary image forming surface is confirmed via the secondary image forming optical system. Moreover, it is possible to confirm optical information via the photographing information display member and confirm a focused portion via the focused portion display member.

Moreover, it is preferable that the present third camera has a finder optical system disposed along the optical path in the direction different from that of the first imaging medium; and a second optical path branching member capable of switching an optical path directed to the second imaging medium and an optical path directed to the last surface of the finder optical system at a position in the middle of the optical path of the finder optical system. When the optical path is switched to the optical path directed to the second imaging medium via the second optical path branching member, display operations of the photographing information display member and the focused portion display member are turned off.

When the optical path is switched to the optical path directed to the second imaging medium, it is not necessary to turn on the display operations of the photographing information display member and the focused portion display member to add the photographing information, the focused portion and the like to the subject image before photographed, because desired information can be added to the subject image picked up via the second image sensor to display or record the image by using one of known image processing arts.

Therefore, in a case where the optical path can be switched to the optical path directed to the second imaging medium so as to turn off the display operations of the photographing information display member and the focused portion display member, power consumption can be saved.

Moreover, in general, an optical view finder (OVF) is premised on the existence of a focus adjustment function in human eye. Therefore, in the finder optical system of the camera according to the present invention, it is possible to achieve large allowable values of positional deviations among a screen mat, the photographing information display member and the focused portion display member.

Therefore, if it is set that the display operations of the photographing information display member and the focused portion display member are turned off when the optical path is switched to the optical path directed to the second image sensor, the designing requirement of positional accuracies of the photographing information display member and the focused portion display member may match that of the optical path for use in the optical finder having a large allowable value of the positional deviation. Therefore, the photographing information display member and the focused portion display member can be arranged with ease, and this point is advantageous to layout design and assembly.

It is to be noted that the photographing information display member and the focused portion display member of the camera of the present invention are display members arranged for the optical finder. The photographing information display member has a function of displaying information such as a shutter speed, F-number and the remaining number of images which can be photographed in a peripheral area of the subject image or outside the image. The focused portion display member displays a position to be focused or a focused position among a plurality of focus setting points (multipoint ranging), and has a function of displaying, for example, a mark superimposed on the subject image.

Moreover, in the present third camera, it is preferable that at least one of a surface having a condensing function and a mat surface is disposed in parallel with the primary image forming surface in the vicinity of the primary image forming surface.

When the surface having the condensing function is disposed in parallel with the primary image forming surface in the vicinity of the primary image forming surface, aberration fluctuations can be minimized. Moreover, the subject light flux is refracted so as to be directed to the incidence pupil of the secondary image forming optical system, and shading of rays or a remarkable drop of a quantity of peripheral light can be prevented in a screen peripheral portion of the image data acquired by the second imaging medium.

Furthermore, when the mat surface is disposed in parallel with the primary image forming surface in the vicinity of the primary image forming surface, deterioration of the subject image due to diffusion can be minimized. Moreover, the subject light flux strikes on the incidence pupil of the secondary image forming optical system owing to diffusion of the mat surface, and the shading of the rays or the remarkable drop of the quantity of the peripheral light can be prevented in the screen peripheral portion of the image data acquired by the second imaging medium.

In addition, in the present third camera, it is preferable that the secondary image forming optical system includes a plurality of optical reflective surfaces.

According to such a constitution, for example, the optical path can arbitrarily be bent using a mirror or a prism to compactly dispose the second imaging medium, and the camera housing can be miniaturized.

Moreover, a fourth camera includes a first imaging medium which acquires subject image data from a subject light flux transmitted through a photographing lens; an optical path branching member disposed in the image pickup optical path of the first imaging medium and capable of changing the optical path of the subject light flux; a finder optical system having a primary image forming surface of a subject image and a plurality of reflective members and disposed in the optical path changed by the optical path branching member; a second imaging medium which acquires the data of a subject image formed on the primary image forming surface; a secondary image forming optical system which projects the subject image formed on the primary image forming surface onto the second imaging medium; a photometry member which detects brightness of the subject image formed on the primary image forming surface; a photometry optical system which guides a light flux emitted from the subject image formed on the primary image forming surface to the photometry member; and a subject image display member capable of displaying the subject image data acquired by at least one of the first imaging medium and the second imaging medium. Moreover, the camera is characterized in that the following condition equation (4) is satisfied:

$$0.5 \leq ENP1/EPAE \leq 1.7 \qquad (4),$$

in which ENP1 is a distance from the primary image forming surface to the incidence pupil of the secondary image forming optical system, and EPAE is a distance from the primary image forming surface to the incidence pupil of the photometry optical system.

Since the present fourth camera is constituted to satisfy the condition equation (4), shading of the subject light flux split or refracted from the finder optical system does not easily occur. In the subject image data acquired from the subject light flux by the second imaging medium and photometry data acquired by the photometry member, problems that a screen peripheral portion darkens and that precision of the photometry data drops do not easily occur.

Furthermore, a fifth camera includes a first imaging medium which acquires subject image data from a subject light flux transmitted through a photographing lens; an optical path branching member disposed in an image pickup optical path of the first imaging medium and capable of changing an optical path of the subject light flux; a finder optical system having a primary image forming surface of a subject image and a plurality of reflective members and disposed along an optical path changed by the optical path branching member; a second imaging medium which acquires the data of a subject image formed on the primary image forming surface; a secondary image forming optical system which again forms the subject image formed on the primary image forming surface onto the second imaging medium; a photometry member which detects brightness of the subject image formed on the primary image forming surface; a photometry optical system which guides a light flux emitted from the subject image formed on the primary image forming surface to the photometry member; and a subject image display member capable of displaying the subject image data acquired by at least one of the first imaging medium and the second imaging medium. Moreover, the camera is characterized in that the photometry member is disposed in the vicinity of the reflective member having the largest paraxial distance from the primary image forming surface in the optical path of the finder optical system and that the following condition equation (5) is satisfied:

$$|EPAE-MSL| \leq 20 \qquad (5),$$

in which EPAE is a distance from the primary image forming surface to the incidence pupil of the photometry optical system, and MSL is a distance from the primary image forming surface to the reflective surface of the reflective member having the largest paraxial distance.

It is to be noted that at this time it is more preferable to satisfy the condition equation (4) of the fourth camera.

According to the present camera of the fifth invention, the photometry member is disposed in the vicinity of the reflective member having the largest paraxial distance from the primary image forming surface in the optical path of the finder optical system. That is, a position of the pupil of the photometry optical system is set to be distant from the primary image forming surface. Therefore, the rays shading does not easily occur in a screen peripheral portion of the photometry data acquired by the photometry member. The photometry member is disposed in the vicinity of the reflective member and in a position which does not interfere with the subject light flux transmitted through the reflective member, the finder optical system and the secondary image forming optical system. Therefore, it is not necessary to dispose a semi-transmitting member such as a half mirror for splitting or refracting the subject light flux to the photometry member, and sufficient brightness is easily obtained in the finder optical system and the second imaging medium. Furthermore, since the camera is constituted to satisfy the condition equation (5), the shading of the subject light flux in the screen peripheral portion does not easily occur, and the whole optical system can be arranged to be compact.

It is to be noted that when the present fifth camera is constituted to satisfy the condition equation (4) of the fourth camera, the shading of the subject light flux split or refracted from the finder optical system does not easily occur even in the fifth camera. In the subject image data acquired from the subject light flux by the second imaging medium and photometry data acquired by the photometry member, problems that the screen peripheral portion darkens and that precision of the photometry data drops do not easily occur. Therefore, the constitution can become more preferable.

First Embodiment

Next, an embodiment of the present invention will be described with reference to the drawings.

Figure 2:
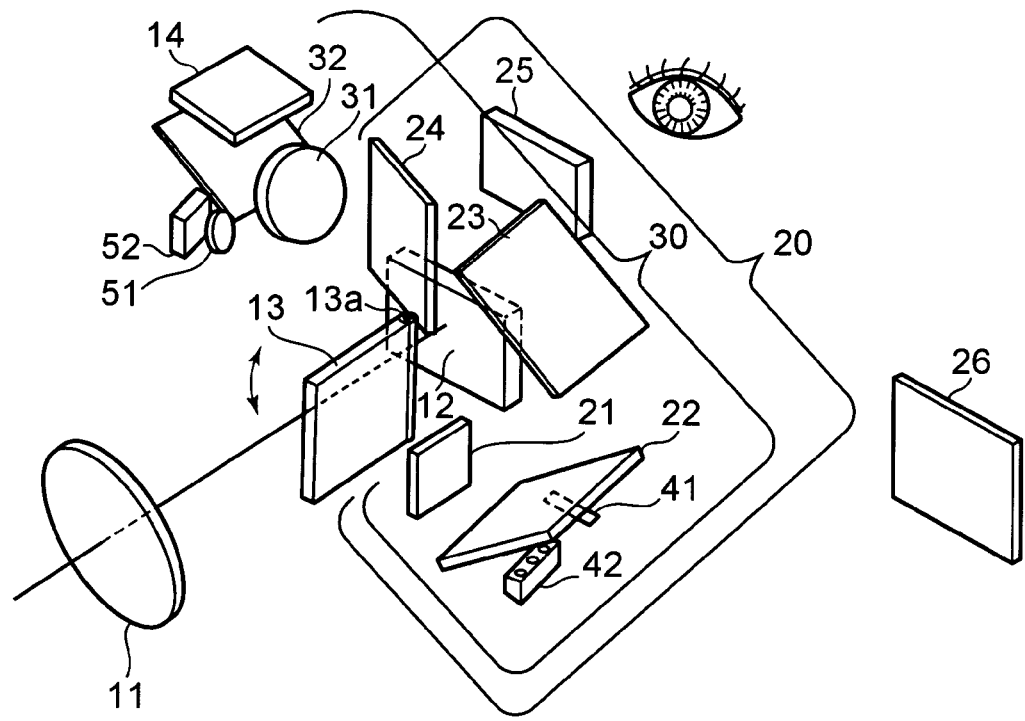
FIG. 2 is a schematic constitution diagram showing an arrangement relation between the optical members during subject photographing in the camera of FIG. 1.

FIG. 1 is a schematic constitution diagram showing an arrangement relation between optical members during subject observation before photographing in a camera according to a first embodiment of the present invention, and FIG. 2 is a schematic constitution diagram showing an arrangement relation between the optical members during subject photographing in the camera of FIG. 1.

The camera of the first embodiment includes a photographing lens 11: a first image sensor 12 as a first imaging medium; a first reflective mirror 13 as an optical path branching member; a finder optical system 20; a screen mat 21 as a screen for a primary image forming surface; a second image sensor 14 as a second imaging medium; a secondary image forming optical system 30; and a subject image display member 26 capable of displaying a subject image picked up via the first image sensor 12 or the second image sensor.

The first image sensor 12 is constituted of a solid image sensor such as a CCD or a CMOS, and has a function of picking up the subject image from a subject light flux transmitted through the photographing lens 11.

The first reflective mirror 13 is disposed between the photographing lens 11 and the first image sensor 12, and constituted as a movable mirror which is rotatable around a shaft 13a. Moreover, the first reflective mirror 13 retreats from an optical path extending from the photographing lens 11 to the first image sensor 12, when guiding a light flux from the photographing lens 11 to the first image sensor 12. On the other hand, when the light flux is guided to the finder optical system 20 or the secondary image forming optical system 30, the first reflective mirror is inserted into the optical path extending from the photographing lens 11 to the first image sensor 12. The mirror has a function of an optical path switch member. When the first reflective mirror 13 is inserted into the optical path to guide the light flux to the finder optical system 20 or the secondary image forming optical system 30, the mirror reflects an incident light flux at an angle of about 90° with respect to an optical axis of the photographing lens 11.

The finder optical system 20 is disposed in an optical path in a direction different from that of the first image sensor 12, the path being formed by reflecting light by the first reflective mirror 13, and the finder optical system includes the screen mat 21, a second reflective mirror 22, a third reflective mirror 23, a fourth reflective mirror 24 and an eyepiece lens system 25.

The screen mat 21 is disposed in a position where the subject image is formed from the subject light flux reflected via the first reflective mirror 13. The screen mat 21 has a diffractive surface capable of guiding light having a visible wavelength band among transmitted light to optical paths of the finder optical system 20 and the secondary image forming optical system 30, and further capable of guiding light (e.g., an infrared ray) having a predetermined wavelength other than the visible wavelength band to an optical path of a photometry member described later separately from the above optical path.

The second reflective mirror 22 is constituted of a half mirror. The second reflective mirror 22 is disposed in a reflected optical axis of the first reflective mirror 13 at a time when the first reflective mirror 13 is inserted into the optical path extending from the photographing lens 11 to the first image sensor 12. Moreover, the second reflective mirror 22 reflects the light flux reflected via the first reflective mirror 13 at an angle of about 90° with respect to the reflected optical axis of the first reflective mirror 13.

The third reflective mirror 23 is disposed in a reflected optical axis of the second reflective mirror 22. Moreover, the third reflective mirror 23 reflects the light flux at an angle of about 90° with respect to the reflected optical axis of the second reflective mirror 22.

The fourth reflective mirror 24 is constituted of a half mirror. The fourth reflective mirror 24 is disposed in a reflected optical axis of the third reflective mirror 23. Moreover, the fourth reflective mirror 24 reflects a part of the incident light flux at an angle of about 90° with respect to the reflected optical axis of the third reflective mirror 23, and transmits another incident light flux.

The second image sensor 14 is disposed in an optical path formed so as to deviate from that of the finder optical system 20 at a time when the incident light flux is transmitted through the fourth reflective mirror 24 midway in the optical path of the finder optical system 20. Moreover, the second image sensor is constituted so as to pick up the subject image formed on the screen mat 21.

The secondary image forming optical system 30 has the second mirror 22, the third mirror 23, the fourth mirror 24, an image pickup lens system 31 and a mirror 32. The image pickup lens system 31 and the mirror 32 are arranged in an optical path which deviates from the optical path of the finder optical system 20 at a time when the light flux passes through the fourth mirror 24. Moreover, the secondary image forming optical system 30 projects the subject image formed on the screen mat 21 onto the second image sensor 14.

The subject image display member 26 is constituted of a liquid crystal monitor, and disposed under the eyepiece lens system 25 and behind the first image sensor 12. Moreover, when the subject image picked up by the second image sensor 14 is displayed, a position of the subject image in a frame before the photographing can be monitored. When the subject image picked up by the first image sensor 12 is displayed, a recorded image after photographed can be confirmed. These displays can be switched using a known switch control member (not shown).

Moreover, the camera of the present embodiment constituted in this manner satisfies the following condition equation (1):

$$|TAN^{-1}(OBJH/ENP1) - TAN^{-1}(OBJH/ENP2)| \leq 20° \quad (1),$$

in which ENP1 is a distance from the incidence pupil of the secondary image forming optical system 30 to the subject image formed on the screen mat 21 (the primary image forming surface) along the optical axis, and ENP2 is a distance from the incidence pupil of the finder optical system 20 to the subject image formed on the screen mat 21 (the primary image forming surface) along the optical axis. Here, it is assumed that an eye point of the finder optical system 20 has an arbitrary value in a range of 0 to 50 mm from the last surface of the finder optical system 20 toward an observation side. Moreover, OBJH is the maximum effective ray height on the screen mat 21 (the primary image forming surface).

Furthermore, the camera of the present embodiment preferably includes the following constitution.

The secondary image forming optical system 30 has at least one positive lens and one negative lens, and the following condition equation (2) is satisfied:

$$10 \leq vp - vn \quad (2),$$

in which vp is the Abbe number in a d-line of the positive lens among the lenses constituting the secondary image forming optical system 30, and vn is the Abbe number in a d-line of the negative lens among the lenses constituting the secondary image forming optical system 30.

Moreover, the secondary image forming optical system 30 has at least two positive lenses, and the following condition equation (3) is satisfied:

$$50 \leq vpmx \quad (3),$$

in which vpmx is the Abbe number in the d-line of the positive lens having the largest power among the lenses constituting the secondary image forming optical system 30.

Furthermore, the secondary image forming optical system 30 is constituted of at least one or more plastic lenses.

In addition, the secondary image forming optical system 30 is constituted of at least one or more aspherical lenses.

Moreover, in the second image sensor 14, a solid image sensor smaller than the first image sensor 12 is used.

Furthermore, the camera of the present embodiment has a photographing information display member 41 and a focused portion display member 42 as common optical members constituting the finder optical system 20 and the secondary image forming optical system 30.

The photographing information display member 41 has a function of superimposing and displaying photographing-related information such as a shutter speed, F-number and the remaining number of images which can be photographed in a peripheral area of the subject image or outside the image.

The focused portion display member 42 has a light source such as an LED, and has a function of superimposing and providing, on the subject image, a predetermined mark indicating a position concerning focusing such as a position to be focused or a focused position among a plurality of focus setting points (multipoint ranging).

In the camera of the present embodiment, the photographing information display member 41 and the focused portion display member 42 are arranged on a side of the second reflective mirror 22 opposite to the screen mat 21. Moreover, directions of the members are adjusted so that an optical axis of emitted light extends along a reflected optical axis of the second reflective mirror 22. Furthermore, the light emitted from the photographing information display member 41 and the focused portion display member 42 is superimposed on a predetermined portion of the subject image reflected via the second reflective mirror 22.

In addition, the camera of the present embodiment has a photometry lens 51 and a photometry image sensor 52 as photometry members.

The photometry lens 51 is disposed in a position slightly deviating from the incidence optical axis of the image pickup lens system 31 toward the photographing lens 11 in the vicinity of the image pickup lens system 31. The photometry image sensor 52 has a solid image sensor such as a CCD, and receives light transmitted through the photometry lens 51.

In the camera of the present embodiment constituted in this manner, during the subject observation, as shown in FIG. 1, the first reflective mirror 13 is inserted into the optical path in order to guide the light flux to the finder optical system 20 or the secondary image forming optical system 30, and rotates at an angle of about 90° with respect to the optical axis of the photographing lens 11 to reflect the incident light flux. The light flux incoming from the subject and reflected via the first reflective mirror 13 is formed into an image on the screen mat 21, and then reflected by the second reflective mirror 22 and the third reflective mirror 23 to strike on the fourth reflective mirror 24. A part of the light flux incoming from the subject and striking on the fourth reflective mirror 24 is reflected by the fourth reflective mirror 24 to strike on the eyepiece lens system 25, and formed into an image in observer's eye via the eyepiece lens system 25. On the other hand, the light flux incoming from the subject and transmitted through the fourth reflective mirror 24, is formed into an image on an image pickup surface of the second image sensor 14 via the image pickup lens system 31 and the mirror 32, and picked up.

The subject image picked up is displayed in a liquid crystal monitor (not shown).

It is to be noted that light having a predetermined wavelength (e.g., infrared light) among the light transmitted through the screen mat 21 is displaced as much as a predetermined amount from the optical axes of the finder optical system 20 and the secondary image forming optical system 30, and diffracted. Moreover, the light is reflected by the second reflective mirror 22 and the third reflective mirror 23. Furthermore, the light transmitted through the fourth reflective mirror 24 is received by the photometry image sensor 52 via the photometry lens 51. Information on a quantity of the light received by the photometry image sensor 52 is transmitted to a known calculation control member (not shown). The calculation control member controls the shutter speed, an aperture stop and the like based on the light quantity information.

Moreover, during the subject observation, the photographing information display member 41 emits the light including the photographing-related information such as the shutter speed, F-number and the number of the remaining images which can be photographed so as to superimpose the light on the peripheral area or the outside of the subject image. The focused portion display member 42 emits, as light, the predetermined mark indicating a position concerning focusing such as the position to be focused or the focused position among the plurality of focus setting points (multipoint ranging) so as to superimpose the light on the light flux from the subject.

The light emitted from the photographing information display member 41 and the focused portion display member 42 is transmitted through the second reflective mirror 22 and superimposed on the light flux from the subject.

On the other hand, during the photographing, as shown in FIG. 2, the first reflective mirror 13 retreats from the optical path extending from the photographing lens 11 to the first image sensor 12. In consequence, the light flux from the subject, transmitted via the photographing lens 11, is picked up via the first image sensor.

At this time, since the camera of the present embodiment satisfies the above condition equation (1), there is not an excessively large difference between the incidence pupil position of the finder optical system 20 and the incidence pupil position of the secondary image forming optical system 30 projected on the second image sensor 14. Therefore, in the subject image observed via the finder optical system 20 or the subject image picked up via the second image sensor 14, generation of shading of rays or a remarkable drop of a peripheral light quantity can be suppressed in a screen peripheral portion. It is possible to suppress generation of a practical problem that the observation using an optical finder or a liquid crystal view finder is hindered.

Moreover, according to the camera of the present embodiment, in a constitution in which the secondary image forming optical system 30 has at least one positive lens and one negative lens, since the following condition equation (2) is satisfied, it is possible to suppress an increase of chromatic aberrations due to a decrease of an achromatic effect produced by the positive and negative lenses. It is possible to obtain a satisfactorily necessary resolution corresponding to a pixel pitch of the image sensor for monitor display.

Furthermore, according to the camera of the present embodiment, in a constitution in which the secondary image forming optical system 30 has at least two positive lenses, since the following condition equation (3), it is possible to suppress the increase of the chromatic aberrations due to enlarged dispersion by the positive lens having the largest power, and it is possible to obtain the satisfactorily necessary resolution corresponding to the pixel pitch of the image sensor for monitor display.

In addition, according to the camera of the present embodiment, since the secondary image forming optical system 30 is constituted of at least one or more plastic lenses, it is possible to inexpensively secure a satisfactorily necessary performance as compared with a case where a glass lens is used.

Moreover, according to the camera of the present embodiment, since the secondary image forming optical system is constituted of at least one or more aspherical lenses, it is possible to secure the sufficiently necessary performance with the small number of the lenses, and the miniaturization and cost reduction of a camera housing can therefore be realized.

Furthermore, according to the camera of the present embodiment, since the second image sensor 14 for use in the second imaging medium is smaller than the first image sensor 12 for use in the first imaging medium, the light flux can be reduced, and the camera can be miniaturized. Moreover, since the small image sensor is used, power consumption can be suppressed. This constitution is advantageous in increasing the number of the images which can be photographed as much as possible. Furthermore, a magnification of the secondary image forming optical system 30 is less than 1, a principal point position of the secondary image forming optical system 30 can be brought close to the second imaging medium (the second image sensor 14), and an advantageous layout is realized. For example, it is easy to dispose a lens element along the optical path branched from that of the finder optical system.

In addition, the camera of the present embodiment includes the photographing information display member 41 and the focused portion display member 42 as a part of common optical members constituting the finder optical system 20 and the secondary image forming optical system 30. In consequence, the subject image data formed on the primary image forming surface (the screen mat 21) is confirmed via the finder optical system 20 and the secondary image forming optical system 30. Moreover, it is possible to confirm optical information via the photographing information display member 41 and confirm a focused portion via the focused portion display member 42.

Moreover, according to the camera of the present embodiment, since the primary image forming surface is disposed on the screen mat 21 or in the vicinity of the mat, the mat surface is disposed in parallel with the primary image forming surface and the condition equation (1') is satisfied, deterioration of the subject image due to diffusion is minimized. Moreover, in the screen peripheral portion of the image formed by the subject light flux striking on the incidence pupils of the finder optical system 20 and the secondary image forming optical system 30 and picked up via the finder and the second imaging medium, it is possible to prevent the generation of the shading of the rays or the remarkable drop of the peripheral light quantity due to the diffusion of the mat surface. Since the condition equation (1') is satisfied, the difference between the incidence pupil positions of the optical systems which are the finder optical system 20 and the second imaging medium is reduced. Therefore, even if the subject light flux is influenced by refraction of a surface having a condensing function or the diffusion of the mat surface, the shading of the rays or the remarkable drop of the quantity of the peripheral light can be prevented from being easily generated in the screen peripheral portion of the image picked up via the finder and the second imaging medium.

Second Embodiment

Figure 3:
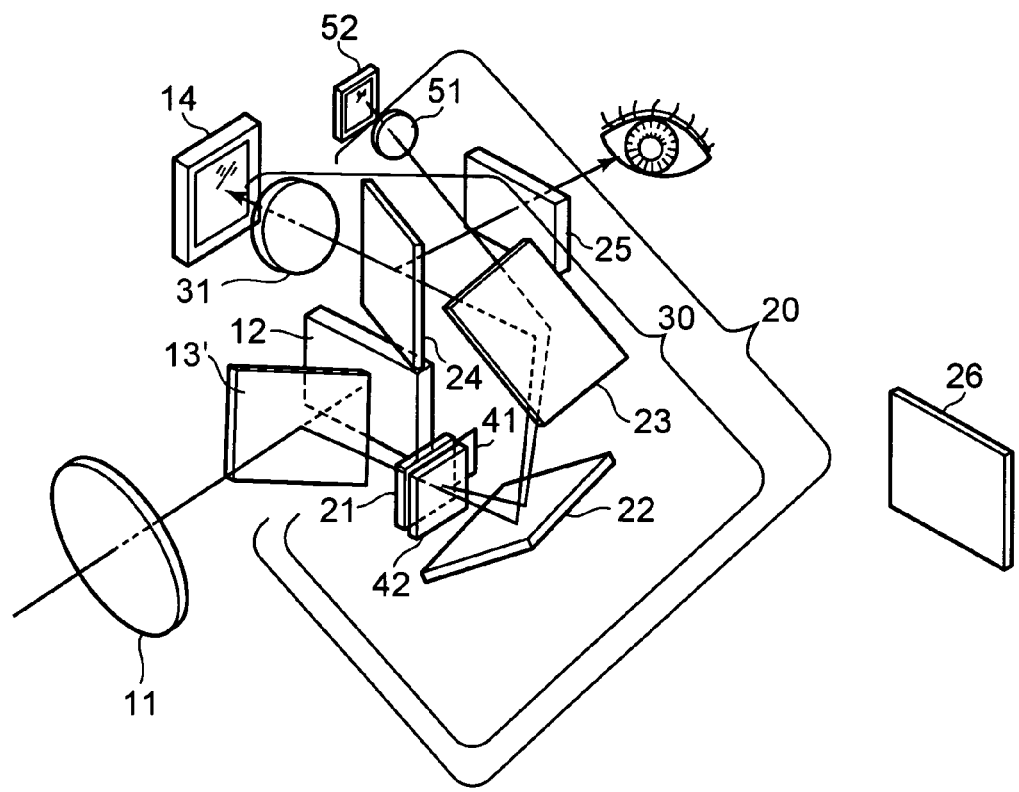
FIG. 3 is a schematic constitution diagram showing an arrangement relation between optical members in a camera according to a second embodiment of the present invention.

FIG. 3 is a schematic constitution diagram showing an arrangement relation between optical members in a camera according to a second embodiment of the present invention.

In the camera of the second embodiment, instead of a first reflective mirror 13, a first reflective mirror 13' constituted of a half mirror is fixed along an optical path between a photographing lens 11 and a first image sensor 12.

The first reflective mirror 13' is disposed so that a part of an incident light flux is transmitted from the photographing lens 11 to guide the light flux to the first image sensor 12, another incident light flux is reflected at an angle of about 90° with respect to an optical axis of the photographing lens 11 and the light flux is guided to the finder optical system 20 or the secondary image forming optical system 30. The mirror has a function of an optical path branching member.

Moreover, in the camera of the present embodiment, a photographing information display member 41 and a focused portion display member 42 are arranged in parallel with the surface of a screen mat 21.

The focused portion display member 42 is constituted of a parallel flat display plate (e.g., a transmission type screen such as a transmission type LCD), and disposed so as to face the screen mat 21.

Furthermore, in the camera of the present embodiment, a photometry lens 51 is disposed in a position slightly deviating from an incidence optical axis of an image pickup lens system 31 toward an eyepiece lens system 25 in the vicinity of the image pickup lens system 31.

In addition, the screen mat 21 is constituted of a diffractive surface having a diffraction angle different from that of the first embodiment so that light having a visible wavelength band among transmitted light is guided to optical paths of a finder optical system 20 and a secondary image forming optical system 30 and light (e.g., an infrared ray) having a predetermined wavelength other than the visible band can be guided to an optical path of a photometry member separately from the above optical paths.

Moreover, the light having the predetermined wavelength (e.g., the infrared light) among the light transmitted through the screen mat 21 is displaced as much as a predetermined amount from the optical axes of the finder optical system 20 and the secondary image forming optical system 30, and diffracted. The light is received by a photometry image sensor 52 via a second reflective mirror, a third reflective mirror 23 and the photometry lens 51.

Furthermore, a second image sensor 14 is disposed to face the image pickup lens system 31, and the mirror 32 in the camera of the first embodiment is not disposed.

Other constitution, function and effect are substantially the same as those of the camera of the first embodiment.

Third Embodiment

Figure 4:
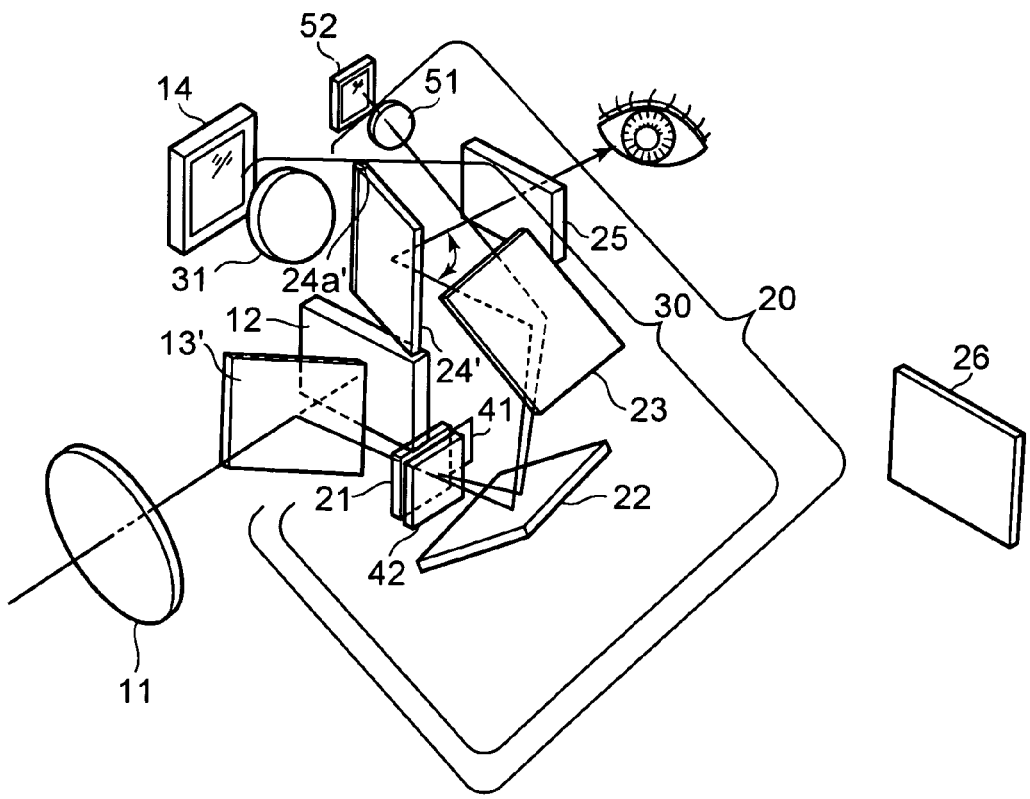
FIG. 4 is a schematic constitution diagram showing an arrangement relation between optical members at a time when a subject is observed with an optical finder in a camera according to a third embodiment of the present invention.
Figure 5:
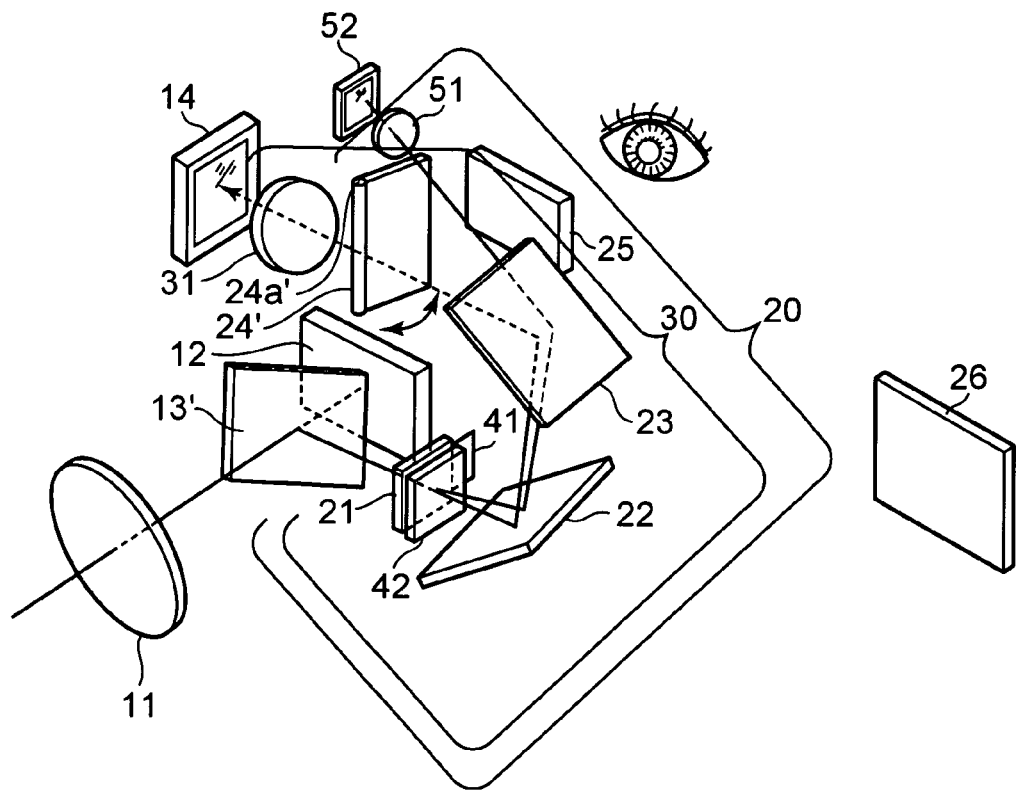
FIG. 5 is a schematic constitution diagram showing an arrangement relation between the optical members at a time when a subject image picked up by a second image sensor is observed with a monitor in the camera of FIG. 4.

FIG. 4 is a schematic constitution diagram showing an arrangement relation between optical members at a time when a subject is observed with an optical finder in a camera according to a third embodiment of the present invention, and FIG. 5 is a schematic constitution diagram showing an arrangement relation between the optical members at a time when a subject image picked up by a second image sensor is observed with a monitor in the camera of FIG. 4.

In the camera of the third embodiment, instead of a fourth reflective mirror 24 in the camera of the second embodiment shown in FIG. 3, a fourth reflective mirror 24' is disposed as a second optical path branching member.

The fourth reflective mirror 24' is constituted as a movable mirror which is rotatable around a shaft 24a'. Moreover, when a light flux is guided to an eyepiece lens system 25, as shown in FIG. 4, the fourth reflective mirror 24' is inserted into an optical path extending from a third reflective mirror 23 to a second image sensor 14. On the other hand, when the light flux is guided from the photographing lens 11 to the second image sensor 14, as shown in FIG. 5, the fourth reflective mirror retreats from the optical path extending from the third reflective mirror 23 to the second image sensor 14, and the fourth reflective mirror has a function of an optical path switch member.

Other constitution, function and effect are substantially the same as those of the camera of the second embodiment.

It is to be noted that in these cameras of the first to third embodiments, the screen mat 21 as the screen for the primary image forming surface disposed along the optical path extending to the second image sensor 14 may be provided with a diffusing function or a transmitting function of a plain plate having no or little diffusion property.

Moreover, if necessary, the surface (e.g., a Fresnel lens surface or the like) having a condensing function may be disposed in the vicinity of this primary image forming surface (on a side of the screen mat 21 opposite to the primary image forming surface).

Furthermore, the camera of the third embodiment may be constituted of a known control unit (not shown) which executes a control so as to turn off display operations of the photographing information display member 41 and the focused portion display member 42 at a time when the fourth reflective mirror 24' is inserted into the optical path extending to the second image sensor 14.

Next, specific examples of the first to third embodiments will be described with reference to the drawings.

EXAMPLE 1

Figure 6:
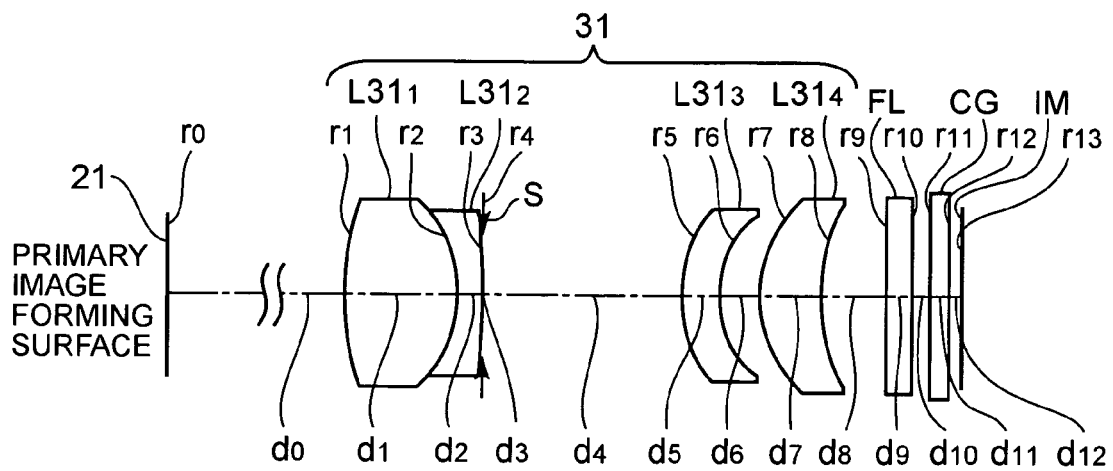
FIG. 6 is a sectional view along an optical axis, showing an optical constitution of a secondary image forming optical system 30 in a camera according to Example 1 of the present invention.
Figure 7:
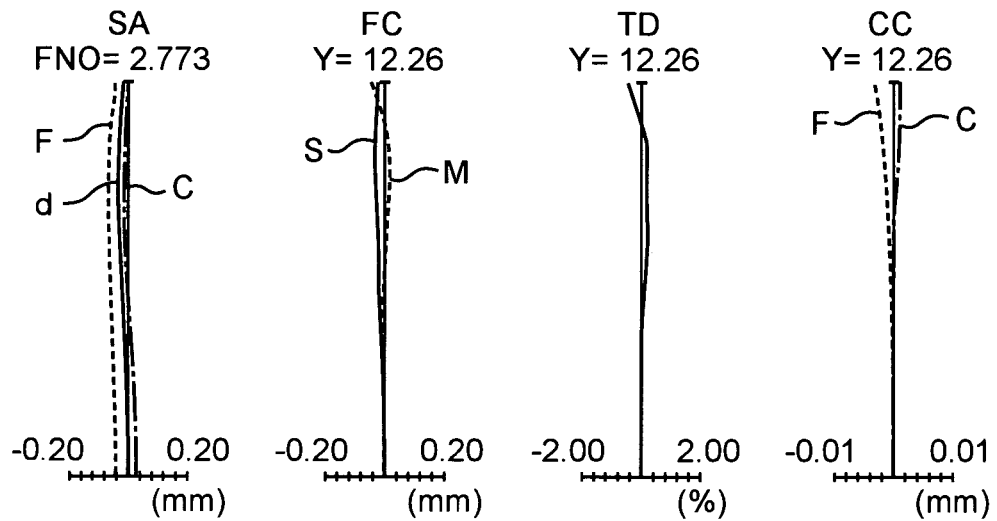
FIG. 7 is a diagram of various aberrations of the secondary image forming optical system 30 shown in FIG. 6.

FIG. 6 is a sectional view along an optical axis, showing an optical constitution of a secondary image forming optical system 30 in a camera according to Example 1 of the present invention, and FIG. 7 is a diagram of various aberrations of the secondary image forming optical system 30 shown in FIG. 6. It is to be noted that in FIG. 6, for the sake of convenience, an optical axis is converted into a straight line to show the optical constitution. Mirrors are omitted, and a constitution of an image pickup lens system 31 is substantially shown. A spherical aberration and a chromatic aberration of magnification are shown in numeric values in wavelengths of 587.6 nm (a d-line: a solid line), 486.1 nm (an F-line: a dotted line) and 656.3 nm (a C-line: a one-dot chain line). As to an astigmatism, a sagital surface is shown by a solid line, and a meridional surface is shown by a dotted line.

In the drawings, SA is a spherical aberration, AS is an astigmatism, DT is a distortion and CC is a chromatic aberration of magnification. In the drawings, "Y" is the image height.

In the camera of the present example, as an arrangement constitution of basic optical members, any of constitutions of the above first to third embodiments is used.

In addition, in the camera of the present example, the image pickup lens system 31 of the secondary image forming optical system 30 is constituted of, in order from an object side, a cemented lens of a double-convex lens $L31_1$ and a negative meniscus lens $L31_2$ whose concave surface faces the object side; an aperture stop S; a negative meniscus lens $L31_3$ whose convex surface faces the object side; and a positive meniscus lens $L31_4$ whose convex surface faces the object side. It is to be noted that in FIG. 6, FL is a filter such as an infrared cut filter or an ultraviolet cut filter, CG is a cover glass, and IM is an image pickup surface of a second image sensor 14.

The negative meniscus lens $L31_3$ and the positive meniscus lens $L31_4$ are constituted of plastic lenses, respectively.

In addition, in the camera of the present example, a $\frac{4}{3}$-sized element is used in a first image sensor 12, and a $\frac{1}{4}$-sized element is used in the second image sensor 14.

Next, numeric value data of optical members constituting the secondary image forming optical system 30 will be described in the camera of the present example shown in FIG. 6.

It is to be noted that in the numeric value data, f is a focal length; F-number is the F number; $S_0, S_1, S_2, \ldots$ are surface numbers; $r_0, r_1, r_2, \ldots$ are radiuses of curvatures of the optical members; $d_0, d_1, d_2, \ldots$ are surface spaces (thicknesses or air spaces) between the optical members; $n_{d0}, n_{d1}, n_{d2}, \ldots$ are refractive indexes of the optical members in d-lines ($\lambda$=587.6 nm); $v_{d0}, v_{d1}, v_{d2}, \ldots$ are the Abbe numbers of the optical members in the d-lines; and $d_0$ is a distance from the primary image forming surface to the first surface of the image pickup lens system 31 along the optical axis. They are common to numeric value data of the following examples.

Moreover, in a table of the numeric value data, the surface provided with (AS) is an aspherical surface. Assuming that a height vertical to the optical axis is H, a displacement amount in an optical axis direction in the height H at a time when a surface vertex is an origin is X(H), a paraxial radius of curvature is R, a conic constant is K, and 2-nd, 4-th, 6-th, 8-th and 10-th order aspherical surface coefficients are A, B, C, D and E, respectively, an equation indicating an aspherical surface shape is represented by the following equation (A):

$$X(H) = (H^2/R^2)/\{1+[1-(1+K)\cdot(H^2/R^2)]^{1/2}\} + AH^2 + BH^4 + CH^6 + DH^8 + EH^{10} \quad (A).$$

Furthermore, in the table of the numeric value data, (S) is an aperture stop, (PI) is a primary image forming surface and (FI) is an image surface.

Numeric Value Data 1 (Example 1): Optical System (Secondary Image Forming Optical System 30) of Second Imaging Medium (for Framing Monitor)

| | | f = 10.58 mm<br>F-number = 2.77 | | |
|---|---|---|---|---|
| $S_0$ | $r_0 = \infty$(PI) | $d_0 = 67.00$ | | |
| $S_1$ | $r_1 = 7.801$ | $d_1 = 3.18$ | $n_{d1} = 1.51633$ | $v_{d1} = 64.14$ |
| $S_2$ | $r_2 = -3.320$ | $d_2 = 0.70$ | | |
| $S_3$ | $r_3 = -28.993$ | $d_3 = 0.03$ | $n_{d2} = 1.54814$ | $v_{d2} = 45.79$ |
| $S_4$ | $r_4 = \infty$(S) | $d_4 = 5.47$ | | |
| $S_5$ | $r_5 = 3.4874$ | $d_5 = 1.00$ | $n_{d5} = 1.58423$ | $v_{d5} = 30.49$ |
| $S_6$ | $r_6 = 2.3412$(AS) | $d_6 = 1.16$ | | |
| $S_7$ | $r_7 = 2.8290$(AS) | $d_7 = 1.68$ | $n_{d7} = 1.52542$ | $v_{d7} = 55.78$ |
| $S_8$ | $r_8 = 4.6362$ | $d_8 = 1.78$ | | |
| $S_9$ | $r_9 = \infty$ | $d_9 = 0.75$ | $n_{d9} = 1.51633$ | $v_{d9} = 64.14$ |
| $S_{10}$ | $r_{10} = \infty$ | $d_{10} = 0.50$ | $n_{d11} = 1.51633$ | $v_{d11} = 64.14$ |
| $S_{11}$ | $r_{11} = \infty$ | $d_{11} = 0.50$ | | |
| $S_{12}$ | $r_{12} = \infty$ | $d_{12} = 0.37$ | | |
| $S_{13}$ | $r_{13} = \infty$(FI) | | | |

Aspherical Surface Coefficient
6th surface ($S_6$)

R = 2.3412    K = −0.5159
A = 0.0000 × 10⁰    B = −4.0713 × 10⁻⁴    C = 1.3256 × 10⁻³
D = −4.2298 × 10⁻⁴    E = 7.4181 × 10⁻⁵

7th surface ($S_7$)

R = 2.8290    K = 0.7874
A = 0.0000 × 10⁰    B = −8.2674 × 10⁻⁴    C = 4.5775 × 10⁻⁴
D = −4.6031 × 10⁻⁵    E = 4.3502 × 10⁻⁶

EXAMPLE 2

Figure 8:
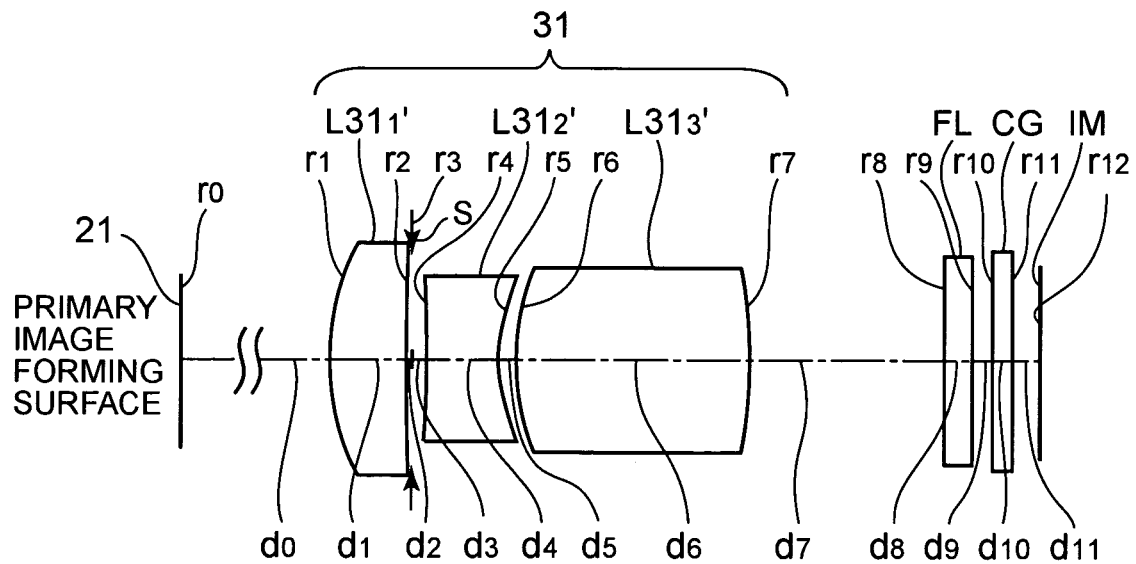
FIG. 8 is a sectional view along an optical axis, showing an optical constitution of a secondary image forming optical system 30 in a camera according to Example 2 of the present invention.
Figure 9:
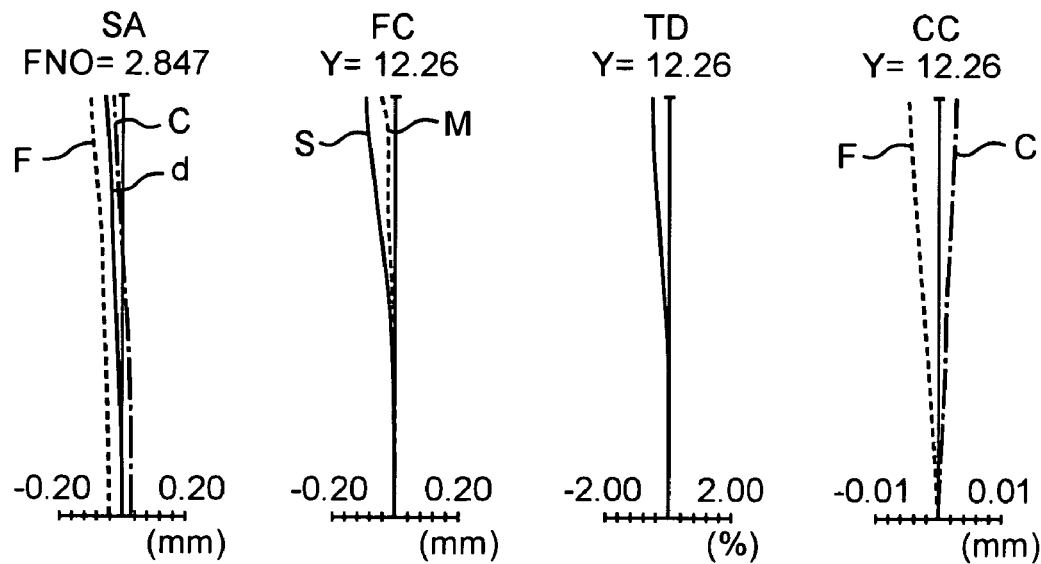
FIG. 9 is a diagram of various aberrations of the secondary image forming optical system 30 shown in FIG. 8.

FIG. 8 is a sectional view along an optical axis, showing an optical constitution of a secondary image forming optical system 30 in a camera according to Example 2 of the present invention, and FIG. 9 is a diagram of various aberrations of the secondary image forming optical system 30 shown in FIG. 8. It is to be noted that in FIG. 8, for the sake of convenience, an optical axis is converted into a straight line to show the optical constitution. Mirrors are omitted, and a constitution of an image pickup lens system 31 is substantially shown. A spherical aberration and a chromatic aberration of magnification are shown in numeric values in wavelengths of 587.6 nm (a d-line: a solid line), 486.1 nm (an F-line: a dotted line) and 656.3 nm (a C-line: a one-dot chain line).

In the camera of the present example, as an arrangement constitution of basic optical members, any of constitutions of the above first to third embodiments is used.

In addition, in the camera of the present example, the image pickup lens system 31 of the secondary image forming optical system 30 is constituted of, in order from an object side, a positive meniscus lens L31₁' whose convex surface faces the object side; an aperture stop S; a double-concave lens L31₂'; and a double-convex lens L31₃'. It is to be noted that in FIG. 8, FL is a filter such as an infrared cut filter or an ultraviolet cut filter, CG is a cover glass, and IM is an image pickup surface of a second image sensor 14.

In addition, in the camera of the present example, a ⁴⁄₃-sized element is used in a first image sensor 12, and a ¼-sized element is used in the second image sensor 14.

Next, numeric value data of optical members constituting the secondary image forming optical system 30 of the present example shown in FIG. 8 will be described. In a table of the numeric value data, (S) is an aperture stop, (PI) is a primary image forming surface and (FI) is an image surface.

Numeric Value Data 2 (Example 2): Optical System (Secondary Image Forming Optical System 30) of Second Imaging Medium (for Framing Monitor)

| | | f = 10.42 mm<br>F-number = 2.85 | | |
|---|---|---|---|---|
| $S_0$ | $r_0 = \infty$(PI) | $d_0 = 63.00$ | | |
| $S_1$ | $r_1 = 6.1409$ | $d_1 = 2.00$ | $n_{d1} = 1.72916$ | $v_{d1} = 54.68$ |
| $S_2$ | $r_2 = 139.8827$(S) | $d_2 = 0.54$ | | |
| $S_3$ | $r_3 = -17.8971$ | $d_3 = 1.80$ | $n_{d3} = 1.59270$ | $v_{d3} = 35.31$ |
| $S_4$ | $r_4 = 4.2153$ | $d_4 = 0.50$ | | |
| $S_5$ | $r_5 = 6.9968$ | $d_5 = 5.88$ | $n_{d5} = 1.72916$ | $v_{d5} = 54.68$ |
| $S_6$ | $r_6 = -10.8500$ | $d_6 = 5.00$ | | |
| $S_7$ | $r_7 = \infty$ | $d_7 = 0.75$ | $n_{d7} = 1.51633$ | $v_{d7} = 64.14$ |
| $S_8$ | $r_8 = \infty$ | $d_8 = 0.50$ | | |
| $S_9$ | $r_9 = \infty$ | $d_9 = 0.50$ | $n_{d9} = 1.51633$ | $v_{d9} = 64.14$ |
| $S_{10}$ | $r_{10} = \infty$ | $d_{10} = 0.74$ | | |
| $S_{11}$ | $r_{11} = \infty$(FI) | | | |

EXAMPLE 3

Figure 10:
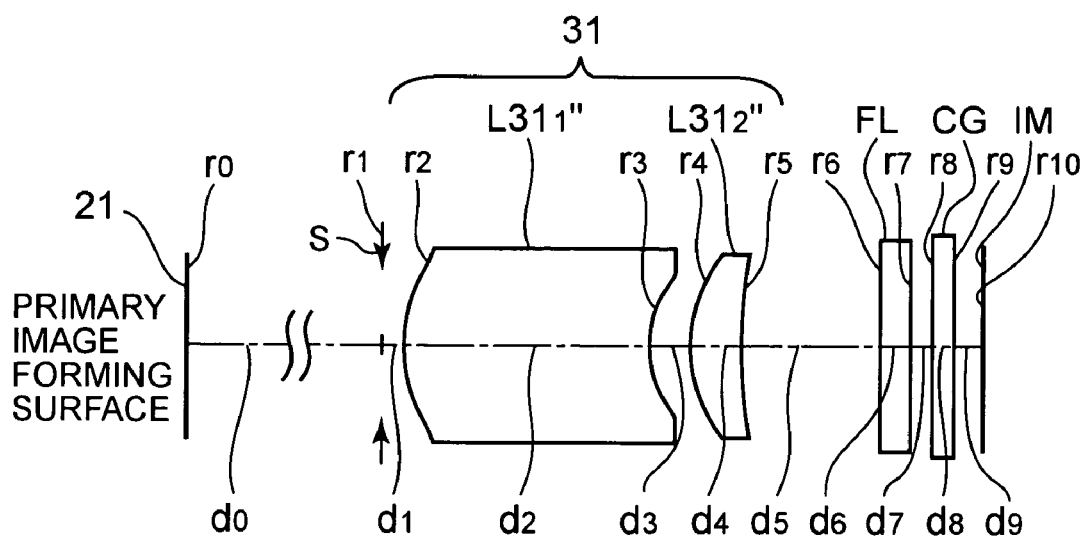
FIG. 10 is a sectional view along an optical axis, showing an optical constitution of a secondary image forming optical system 30 in a camera according to Example 3 of the present invention.
Figure 11:
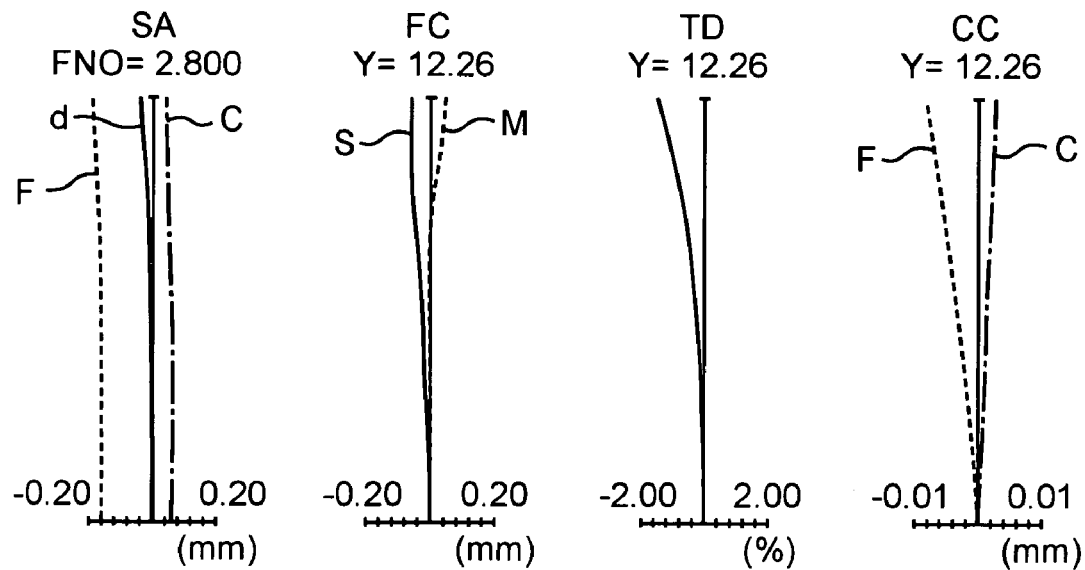
FIG. 11 is a diagram of various aberrations of the secondary image forming optical system 30 shown in FIG. 10.

FIG. 10 is a sectional view along an optical axis, showing an optical constitution of a secondary image forming optical system 30 in a camera according to Example 3 of the present invention, and FIG. 11 is a diagram of various aberrations of the secondary image forming optical system 30 shown in FIG. 10. It is to be noted that in FIG. 10, for the sake of convenience, an optical axis is converted into a straight line to show the optical constitution. Mirrors are omitted, and a constitution of an image pickup lens system 31 is substantially shown. A spherical aberration and a chromatic aberration of magnification are shown in numeric values in wavelengths of 587.6 nm (a d-line: a solid line), 486.1 nm (an F-line: a dotted line) and 656.3 nm (a C-line: a one-dot chain line).

Even in the camera of the present example, as an arrangement constitution of basic optical members, any of constitutions of the above first to third embodiments is used.

In addition, in the camera of the present example, the image pickup lens system 31 of the secondary image forming optical system 30 is constituted of, in order from an object side, an aperture stop; a positive meniscus lens L31₁" whose convex surface faces the object side; and a positive meniscus lens L31₂" whose convex surface faces the object side. It is to be noted that in FIG. 10, FL is a filter such as an infrared cut filter or an ultraviolet cut filter, CG is a cover glass, and IM is an image pickup surface of a second image sensor 14.

The positive meniscus lenses L31₁" and L31₂" are constituted of plastic lenses, respectively.

In addition, in the camera of the present example, a ⁴⁄₃-sized element is used in a first image sensor 12, and a ¼-sized element is used in the second image sensor 14.

Next, numeric value data of optical members constituting the secondary image forming optical system 30 of the present example shown in FIG. 10 will be described. In a table of the numeric value data, (AS) is an aspherical surface, (S) is an aperture stop, (PI) is a primary image forming surface and (FI) is an image surface.

Numeric Value Data 3 (Example 3): Optical System (Secondary Image Forming Optical System 30) of Second Imaging Medium (for Framing Monitor)

| | f = 9.96 mm F-number = 2.80 | | | |
|---|---|---|---|---|
| $S_0$ | $r_0 = \infty(PI)$ | $d_0 = 64.00$ | | |
| $S_1$ | $r_1 = \infty(S)$ | $d_1 = 0.50$ | $n_{d2} = 1.52542$ | $v_{d2} = 55.78$ |
| $S_2$ | $r_2 = 4.082(AS)$ | $d_2 = 6.00$ | | |
| $S_3$ | $r_3 = 2.927$ | $d_3 = 1.00$ | $n_{d4} = 1.52542$ | $v_{d4} = 55.78$ |
| $S_4$ | $r_4 = 3.137(AS)$ | $d_4 = 1.20$ | | |
| $S_5$ | $r_5 = 12.169(AS)$ | $d_5 = 3.40$ | $n_{d6} = 1.51633$ | $v_{d6} = 64.14$ |
| $S_6$ | $r_6 = \infty$ | $d_6 = 0.75$ | | |
| $S_7$ | $r_7 = \infty$ | $d_7 = 0.50$ | $n_{d8} = 1.51633$ | $v_{d8} = 64.14$ |
| $S_8$ | $r_8 = \infty$ | $d_8 = 0.50$ | | |
| $S_9$ | $r_9 = \infty$ | $d_9 = 0.71$ | | |
| $S_{10}$ | $r_{10} = \infty(FI)$ | | | |

| Asherical Surface Coefficient | |
|---|---|
| R = 4.0815 | K = −0.3784 |
| 4th surface ($S_4$) | |
| R = 3.1372 | K = −0.7595 |
| 5th surface ($S_5$) | |
| R = 12.169 | K = 8.7922 |

EXAMPLE 4

Figure 12:
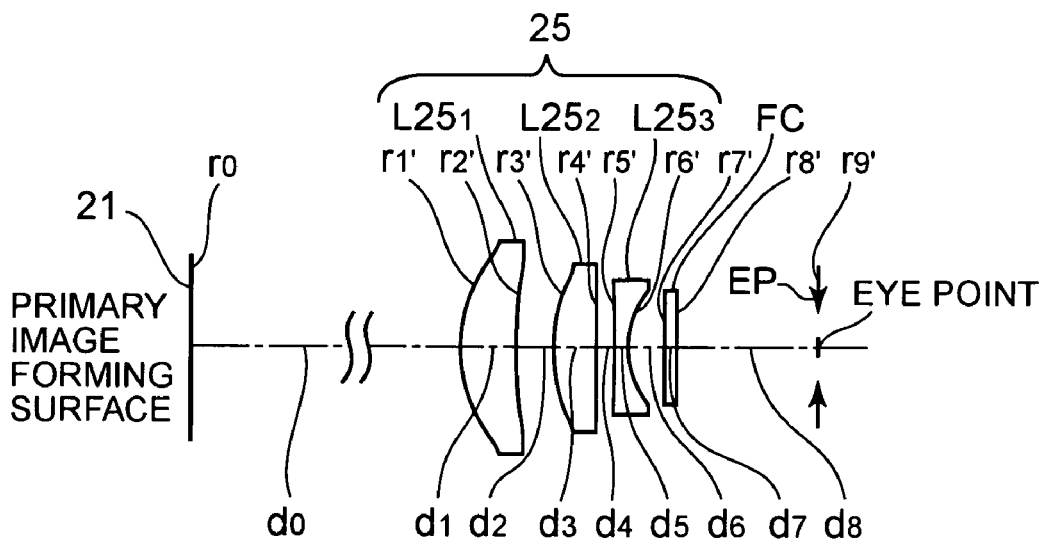
FIG. 12 is a sectional view along an optical axis, showing an optical constitution of a finder optical system 20 in a camera according to Example 4 of the present invention in a state in which a diopter scale is −1 diopter.

FIG. 12 is a sectional view along an optical axis, showing an optical constitution of a finder optical system 20 in a camera according to Example 4 of the present invention in a state in which a diopter scale is −1 diopter. It is to be noted that in FIG. 12, for the sake of convenience, an optical axis is converted into a straight line to show the optical constitution. Mirrors are omitted, and a constitution of an eyepiece lens system 25 is substantially shown.

Even in the camera of the present example, as an arrangement constitution of basic optical members, any of constitutions of the above first to third embodiments is used.

Moreover, in the camera of the present example, as a secondary image forming optical system 30, any of constitutions of Examples 1 to 3 described above is used.

In addition, in the camera of the present example, the eyepiece lens system 25 of the finder optical system 20 is constituted of, in order from an object side, a positive meniscus lens $L25_1$ whose convex surface faces the object side; a double-convex lens $L25_2$; and a double-concave lens $L25_3$. It is to be noted that in FIG. 12, FC is a parallel flat plate which functions as a filter such as an infrared cut filter or an ultraviolet cut filter and a cover glass, and EP is an emission pupil position.

The double-convex lens $L25_2$ is constituted to be movable as much as a predetermined amount along an optical axis for diopter scale adjustment.

Next, numeric value data of optical members constituting the finder optical system 20 of the present example shown in FIG. 12 will be described. In a table of the numeric value data, (AS) is an aspherical surface, (PI) is a primary image forming surface and (OE) is an eye point of an observer. It is to be noted that the diopter scale adjustment has a range of +1.5 diopter to −3.5 diopter.

Numeric Value Data 4 (Example 4): Optical System (Finder Optical System 20) of Optical Finder

| | f = 49.44(+1.5 dpt)~54.61(−1 dpt)~62.44(−3.5 dpt)mm F-number = 3.91~3.94~3.95 | | | |
|---|---|---|---|---|
| $S_0$ | $r_0 = \infty(PI)$ | $d_0 = 80.35$ | | |
| $S_{1'}$ | $r_1' = 19.333$ | $d_1 = 7.10$ | $n_{d1} = 1.51633$ | $v_{d1} = 64.14$ |
| $S_{2'}$ | $r_2' = 71.354$ | $d_2 =$ (variable) | | |
| $S_{3'}$ | $r_3' = 18.149(AS)$ | $d_3 = 5.61$ | $n_{d3} = 1.52542$ | $v_{d2} = 55.78$ |
| $S_{4'}$ | $r_4' = -264.728$ | $d_4 =$ (variable) | | |
| $S_{5'}$ | $r_5' = -88.178$ | $d_5 = 1.80$ | $n_{d5} = 1.58423$ | $v_{d5} = 30.49$ |
| $S_{6'}$ | $r_6' = 12.438$ | $d_6 = 4.41$ | | |
| $S_{7'}$ | $r_7' = \infty$ | $d_7 = 1.20$ | $n_{d7} = 1.51633$ | $v_{d7} = 64.14$ |
| $S_{8'}$ | $r_8' = \infty$ | $d_8 = 16.67$ | | |
| $S_{9'}$ | $r_9' = \infty(OE)$ | | | |

| Aspherical Surface Coefficient 3rd surface ($S_3'$) | | | |
|---|---|---|---|
| R = 18.1494 | K = 0.0000 | | |
| $A = 0.0000 \times 10^0$ | $B = -2.1895 \times 10^{-5}$ | | $C = -6.7082 \times 10^{-8}$ |
| $D = -4.9542 \times 10^{-10}$ | $E = 0.0000 \times 10^0$ | | |

| Variable air Space | 1.5 diopter | −1 diopter | −3.5 diopter |
|---|---|---|---|
| $d_2$ | 3.83 | 4.72 | 5.81 |
| $d_4$ | 3.11 | 2.23 | 1.13 |

Next, condition equation parameters in the cameras of the examples of the present invention are shown in Tables 1 to 5 as follows.

TABLE 1

| | OBJH (mm) | ENP1 (mm) | Diopter scale | ENP2 (mm) | Value corresponding to Condition Equation (1), (1') (°) |
|---|---|---|---|---|---|
| Example 1 4-lens type | 12.255 | 70.107 | +1.5 m$^{-1}$ | 5645.379 | 9.791 |
| | 12.255 | 70.107 | −1.0 m$^{-1}$ | 714.282 | 8.932 |
| | 12.255 | 70.107 | −3.5 m$^{-1}$ | 385.862 | 8.096 |
| Example 2 3-lens type | 12.255 | 64.341 | +1.5 m$^{-1}$ | 5645.379 | 10.660 |
| | 12.255 | 64.341 | −1.0 m$^{-1}$ | 714.282 | 9.801 |
| | 12.255 | 64.341 | −3.5 m$^{-1}$ | 385.862 | 8.965 |
| Example 3 2-lens type | 12.255 | 64.000 | +1.5 m$^{-1}$ | 5645.379 | 10.716 |
| | 12.255 | 64.000 | −1.0 m$^{-1}$ | 714.282 | 9.857 |
| | 12.255 | 64.000 | −3.5 m$^{-1}$ | 385.862 | 9.021 |

Provided that the eye point indicates a value at a time when the point is set to 22.3 mm from the last surface of the finder optical system 20.

TABLE 2

| | Condition Equation (2) | | |
|---|---|---|---|
| | $v_p$ | $v_n$ | Value corresponding to condition equation (2) |
| Example 1 4-lens type | 64.1 | 45.8 | 18.3 |
| Example 2 3-lens type | 54.7 | 35.3 | 19.4 |
| Example 3 2-lens type | 55.8 | 55.8 | This is not the object owing to constitution of two positive lenses. |

TABLE 3

| Condition Equation (3) | |
| --- | --- |
| | $v_{pmx}$ |
| Example 1 4-lens type | 64.1 |
| Example 2 3-lens type | 54.7 |
| Example 3 2-lens type | 55.8 |

Fourth Embodiment

Figure 13:
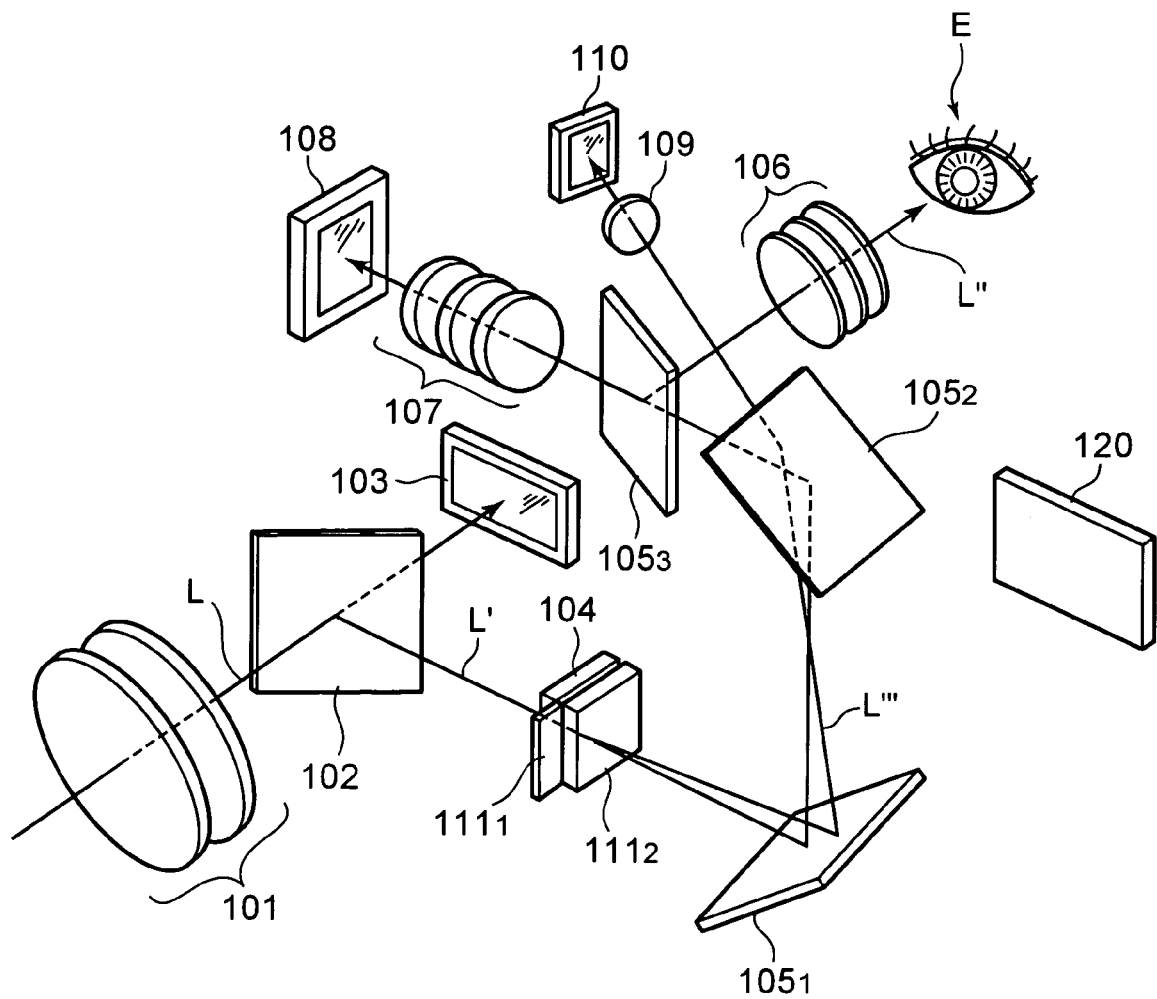
FIG. 13 is a schematic constitution diagram showing an arrangement constitution of optical members of an electronic camera according to a fourth embodiment of the present invention.
Figure 14:
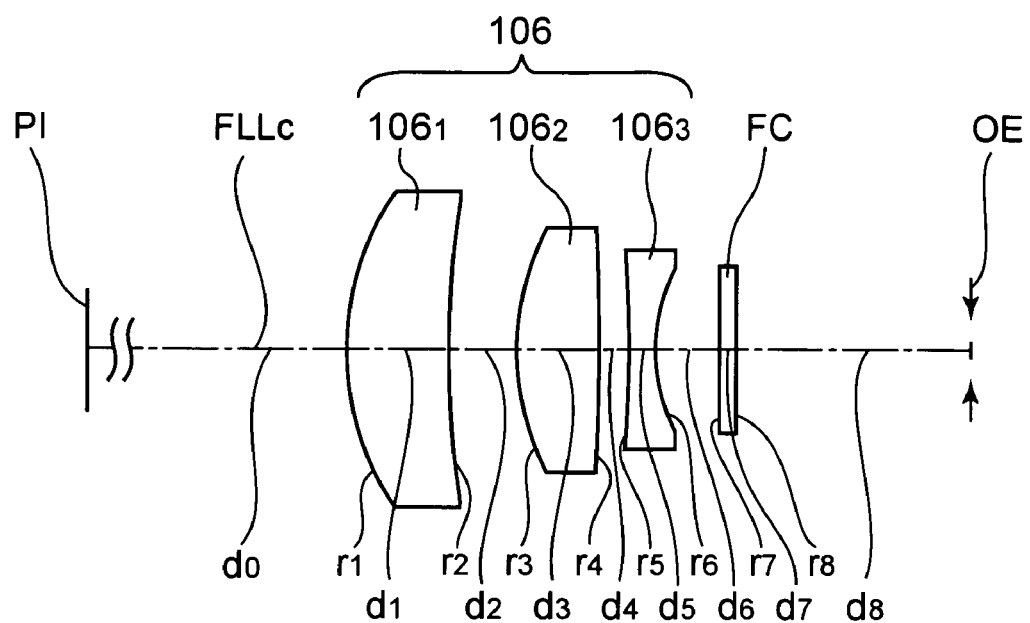
FIG. 14 is a sectional view along an optical axis, showing a constitution of an eyepiece lens system of the electronic camera according to the fourth embodiment of the present invention.
Figure 15:
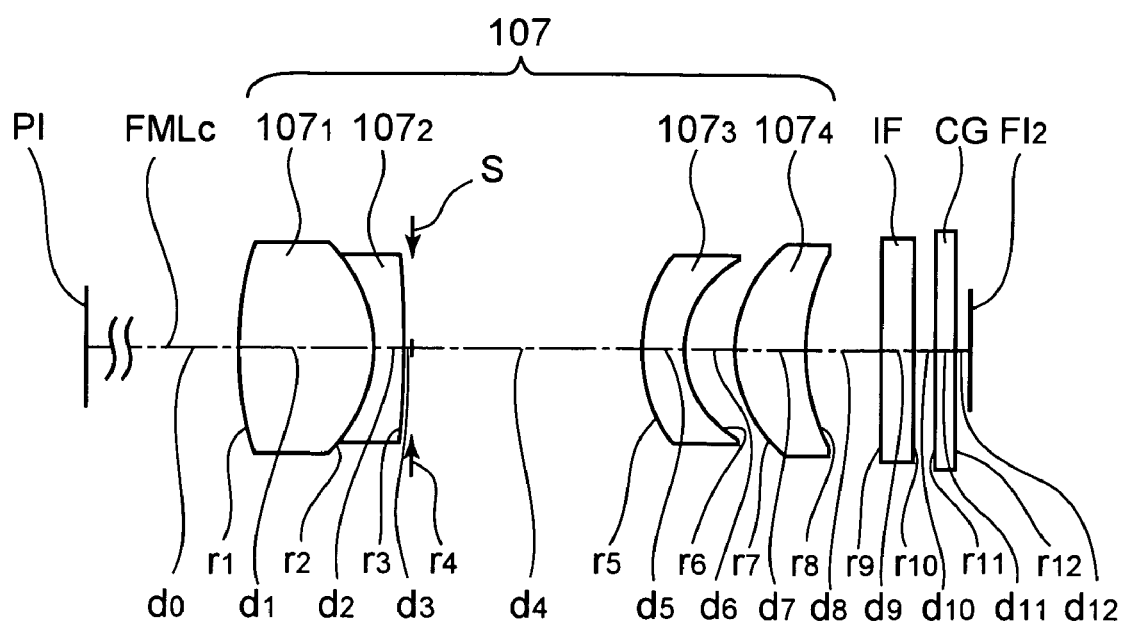
FIG. 15 is a sectional view along the optical axis, showing a constitution of a secondary image forming optical system of the electronic camera according to the fourth embodiment of the present invention.
Figure 16:
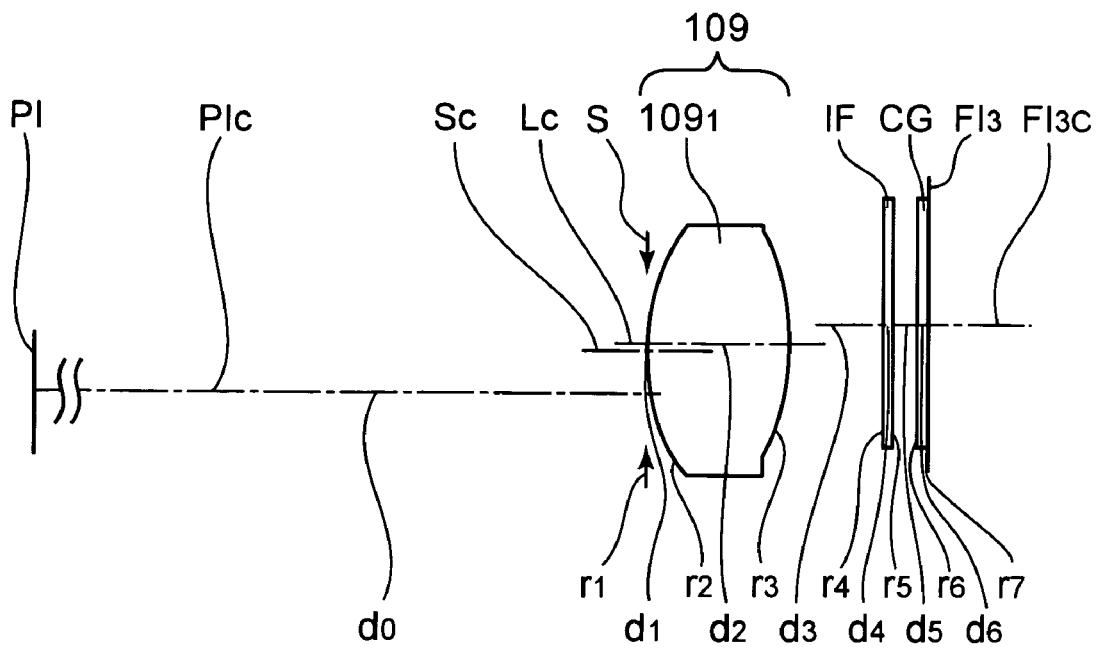
FIG. 16 is a sectional view along the optical axis, showing a constitution of a photometry optical system of the electronic camera according to the fourth embodiment of the present invention.

FIG. 13 is a schematic constitution diagram showing an arrangement constitution of optical members of an electronic camera according to the present embodiment. FIG. 14 is a sectional view along an optical axis, showing a constitution of an eyepiece lens system according to the present embodiment. FIG. 15 is a sectional view along the optical axis, showing a constitution of a secondary image forming optical system for a second imaging medium according to the present embodiment. FIG. 16 is a sectional view along the optical axis, showing a constitution of a photometry optical system according to the present embodiment.

As shown in FIG. 13, the electronic camera of the present embodiment is constituted of a photographing lens system 101; a half mirror 102; a first imaging medium 103; a screen mat 104 which is a screen mat for a primary image forming surface; a mirror $105_1$ which is a first reflective member; a mirror $105_2$ which is a second reflective member; a half mirror $105_3$ which is a third reflective member; an eyepiece lens system 106; a secondary image forming optical system 107; a second imaging medium 108; a photometry optical system 109; a photometry member 110; and a subject image display member 120. A finder optical system is constituted of the screen mat 104, the mirrors $105_1$, $105_2$, the half mirror $105_3$ and the eyepiece lens system 106 among them. It is to be noted that E is an observer's eyeball position (eye point).

In the present embodiment, a subject light flux L incoming from the photographing lens system 101 passes through the half mirror 102 which is an optical path branching member, and is guided to the first imaging medium 103 constituted of an image sensor such as a CCD or a photosensitive recording medium such as a silver salt film. When the subject light flux L passes through the half mirror 102, a subject light flux L' is split from the subject light flux L and guided to the finder optical system.

The finder optical system of the present embodiment is constituted so as to satisfy the following condition equation (B):

$$|\tan^{-1}(OBJH/EPAE) - \tan^{-1}(OBJH/EPFL)| \leq 20° \quad (B),$$

in which OBJH is an effective ray height from the primary image forming surface formed on the screen mat 104, EPAE is a distance from a subject image formed on the primary image forming surface to an incidence pupil of the photometry optical system 109, and EPFL is a distance from the primary image forming surface to an incidence pupil of the finder optical system.

Here, the distance to the incidence pupil of the finder optical system is obtained from an eye point E: with the proviso that the eye point E has an arbitrary value in a range of 0 to 50 mm from the last surface of the finder optical system to an observer side.

Therefore, shading does not easily occur in the subject light flux split or refracted by the finder optical system of the present embodiment.

Moreover, in the finder optical system of the present embodiment, as shown in FIG. 13, a displaying member $111_1$ and a focal displaying member $111_2$ are arranged close to each other in order from the primary image forming surface on an image side of the screen mat 104.

Here, the displaying member $111_1$ has a function of displaying information such as a shutter speed, the F-number and the number of remaining images which can be photographed on a peripheral area or the outside of the subject image to be observed by a user. The focal displaying member $111_2$ displays a position to be focused or a focused point among a plurality of focus setting points (multipoint ranging), and has a function of displaying a mark or the like superimposed on the subject image to be observed by the user. Since the electronic camera of the present embodiment includes these functions, the user can confirm the subject image formed on the screen mat 104 but also optical information displayed in the displaying member $111_1$ and a focused portion displayed in the focal displaying member $111_2$ directly from the eyepiece lens system 106 or a subject image display member 120 such as a liquid crystal display unit displayed via the second imaging medium 108.

Moreover, as shown in FIG. 13, the finder optical system of the present embodiment includes a plurality of reflective members such as the mirror $105_1$ which is the first reflective member, the mirror $105_2$ which is the second reflective member and the half mirror $105_3$ which is the third reflective member having a light transmitting characteristic in order from the primary image forming surface on the image side of the displaying member $111_1$.

These reflective members change the subject image inverted by the photographing lens system 101 to an erected image together with the half mirror 102. Among the reflective members, the third reflective member is the half mirror $105_3$ having the light transmitting characteristic. Therefore, an arrangement constitution of the finder optical system and the second imaging medium can be arranged to be compact.

In the present embodiment, the second imaging medium 108 is constituted of an image sensor such as the CCD, and the subject light flux L' split from the subject light flux L is guided through the half mirror $105_3$ and the secondary image forming optical system 107 including a plurality of lenses. Moreover, in the electronic camera of the present embodiment, subject image data obtained via the second imaging medium 108 can be observed with an image data displaying member (not shown) described above. It is to be noted that a subject light flux L" split and reflected by the half mirror $105_3$ is guided to the eyepiece lens system.

Moreover, in the present embodiment, an image sensor having an effective region smaller than that of the image sensor for use in the first imaging medium 103 is used in the second imaging medium 108.

Therefore, the light flux required for acquiring the subject image data can be reduced, and the camera can be miniaturized. When the small image sensor is used, power consumption can advantageously be suppressed. Furthermore, since a magnification of the secondary image forming optical system 107 can be set to be less than one, a principal point of the lens can be brought close to the second imaging medium 108, and independent optical elements other than the finder optical system and the photometry optical system 109 can easily be arranged. It is to be noted that to reduce the effective region, the image sensors may be densified or an image sensor having a low resolution may be used, Furthermore, in the present embodiment, the image sensor of the second imaging medium 108 acquires the subject image data in a region smaller than the effective region. Subsequently, the subject image display member 120 cuts out the subject image data acquired by the image sensor to display the data.

As described above, in the electronic camera of the present embodiment, the subject image data formed on the primary image forming surface is acquired in the region smaller than the effective region of the image sensor of the second imaging medium. Furthermore, the subject image data is cut out and displayed in the subject image display member 120. Therefore, allowable amounts of a lens magnification, optical axis deviation, attachment precision of the second imaging medium 108 and the like are larger than those in a conventional technology.

In addition, in the present embodiment, the effective region of the image sensor of the second imaging medium 108 is constituted to be broader than a region in which the subject image formed on the primary image forming surface is projected onto the image sensor of the second imaging medium 108.

As described above, since the effective region of the image sensor of the second imaging medium 108 is constituted to be broad, in the electronic camera of the present embodiment, the allowable amounts of the lens magnification, optical axis deviation, attachment precision of the second imaging medium 108 and the like are larger than those in the conventional technology. It is to be noted that, specifically, it is preferable that the effective region of the image sensor of the second imaging medium 108 is about 1.1 to 2.5 times the region in which the subject image formed on the primary image forming surface is projected onto the image sensor of the second imaging medium 108 in a long side direction and a short side direction.

Moreover, in the present embodiment, after the second imaging medium acquires the subject image data, processing is performed to add up the predetermined number of pixel data among the subject image data and form one pixel data.

In a case where the quantity of light of the subject light flux decreases for a reason that the light passes through the half mirror, if a shutter is not opened for a long time, a sufficient electric charge cannot be obtained. However, when the processing is performed to add up a plurality of pixel charges and obtain the charge of one pixel, the pixels of the whole subject image data decrease, but bright data can be acquired.

Furthermore, in the present embodiment, the second imaging medium 108 is disposed along an optical path of the subject light flux L' transmitted through the half mirror $105_3$ which is a reflective member having the largest paraxial distance from the primary image forming surface.

When the second imaging medium 108 is disposed in such a position, the distance of the pupil from the primary image forming surface can further be increased. Furthermore, the distance EPAE from the subject image formed on the primary image forming surface to the incidence pupil of the photometry optical system 109 can be set to be substantially equal to the distance to the image sensor of the second imaging medium 108. Therefore, the shading of the rays does not easily occur in a screen peripheral portion, and the members can further compactly be arranged.

Among the reflective members disposed in the finder optical system, the reflective member having the largest paraxial distance from the primary image forming surface is a member such as the half mirror having a light transmitting characteristic. Therefore, without any complicated mechanism or the like, the subject light flux can be split so as to be guided from the finder optical system to the second imaging medium 108. The subject light flux L is inverted by the photographing lens system 101, but can be changed to the erected image via a reflective surface of the optical path branching member 102 and reflective surfaces of three reflective members of the finder optical system, that is, four reflective surfaces. It is to be noted that since the subject light flux L' guided to the second imaging medium 108 is reflected via the reflective surface of the optical path branching member 102 and the reflective surfaces of two of the reflective members of the finder optical system, that is, three reflective surfaces only, the flux remains to be inverted. However, when output information from the second imaging medium 108 is displayed in the subject image display member 120, the image is inverted into the erected image together with another image processing.

In the present embodiment, the photometry member 110 is constituted of an image sensor such as the CCD, a subject light flux L''' split from the subject light flux L' by the screen mat 104 is refracted by a plurality of reflective members, and guided through the photometry optical system 109 including a plurality of lenses.

Next, constitutions and numeric value data of lenses constituting the optical systems according to the present embodiment will be described.

First, the eyepiece lens system 106 disposed in the finder optical system will be described. In the present embodiment, as shown in FIG. 14, the eyepiece lens system 106 is constituted of, in order from the primary image forming surface, a positive meniscus lens $106_1$ whose convex surface faces the primary image forming surface side; a double-convex positive lens $106_2$ having an aspherical surface on the primary image forming surface side; and a double-concave negative lens $106_3$. Moreover, FLLc is an optical axis of the finder optical system, FC is a parallel flat plate which functions as a cover glass, PI is the primary image forming surface of the screen mat 104 and OE is an eye point. It is to be noted that the double-convex positive lens $106_2$ is constituted to be movable as much as a predetermined amount along the optical axis FLLc for diopter scale adjustment.

As the numeric value data of the lenses constituting this eyepiece lens system 106, for example, the numeric value data of Example 4 described above is usable.

Next, the secondary image forming optical system 107 will be described. In the present embodiment, as shown in FIG. 15, the secondary image forming optical system 107 is constituted of, in order from the primary image forming surface side, a cemented lens of a double-convex positive lens $107_1$ and a negative meniscus lens $107_2$ whose convex surface faces the second imaging medium 108; an aperture stop S; a negative meniscus lens $107_3$ whose convex surface faces the primary image forming surface side and whose surface on a second imaging medium 108 side is an aspherical surface; and a positive meniscus lens $107_4$ having an aspherical surface on the primary image forming surface side. It is to be noted that FMLc is an optical axis of the secondary image forming optical system, IF is an infrared cut film, CG is a cover glass, PI is the primary image forming surface of the screen mat 104 and $FI_2$ is an image pickup surface of an image sensor of the second imaging medium 108.

As the numeric value data of the lenses constituting this secondary image forming optical system 107, for example, those of the secondary image forming optical system in Example 1 described above are usable.

Next, the photometry optical system 109 will be described. In the present embodiment, as shown in FIG. 16, the photometry optical system 109 is constituted of, in order from the primary image forming surface side, an aperture stop and a double-convex positive lens $109_1$ whose opposite surfaces are aspherical surfaces. It is to be noted that PIc is a vertical axis centering on the primary image forming surface; Sc is a vertical axis centering on the aperture stop, Lc is an axis which connects a vertex of a lens $r_2$ to that of $r_3$, $FI_3c$ is a vertical axis centering on the image pickup surface, IF is an infrared cut filter, CG is a cover glass, PI is the primary image forming surface of the screen mat 104 and $FI_3$ is the image pickup surface of the image sensor of the photometry member 110.

Next, numeric value data of the lenses constituting the photometry optical system 109 will be described. In a table of the numeric value data, (AS) is an aspherical surface, (shift) is an axis shift and (DECY) is a shift amount.

Numeric Value Data 5: Photometry Optical System (Photometry Optical System 109)

f = 7.96 mm
F-number = 0.88

| | | | | |
|---|---|---|---|---|
| $S_0$ | $r_0 = \infty$ (PI) | $d_0 = 59.90$ | | |
| $S_1$ | $r_1 = \infty$ (S, shift) | $d_1 = 0$ | | |
| $S_2$ | $r_2 = 6.1936$(AS, shift) | $d_2 = 6.50$ | $n_{d2} = 1.58423$ | $v_{d2} = 30.49$ |
| $S_3$ | $r_3 = -11.4581$(AS) | $d_3 = 4.34$ | | |
| $S_4$ | $r_4 = \infty$(shift) | $d_4 = 0.40$ | $n_{d4} = 1.54000$ | $v_{d4} = 55.00$ |
| $S_5$ | $r_5 = \infty$ | $d_5 = 1.13$ | | |
| $S_6$ | $r_6 = \infty$ | $d_6 = 0.57$ | $n_{d6} = 1.52000$ | $v_{d6} = 55.00$ |
| $S_7$ | $r_7 = \infty$ | $d_7 = 0.00$ | | |
| $S_8$ | $r_8 = \infty$ ($FI_3$) | | | |

Aspherical Surface Coefficient

2nd surface ($S_2$)

R = 6.1936    K = −0.2847
A = 0.0000 × $10^0$    B = −3.3463 × $10^{-4}$    C = −9.3880 × $10^{-6}$
D = 2.0654 × $10^{-7}$    E = −1.2826 × $10^{-8}$

3rd surface ($S_3$)

R = −11.4581    K = −92.5760
A = 0.0000 × $10^0$    B = −2.9196 × $10^{-3}$    C = 2.6092 × $10^{-4}$
D = −1.2751 × $10^{-5}$    E = 2.3198 × $10^{-7}$

Axis Shift (mm)

| Surface | (DECY) |
|---|---|
| $S_1$ | 5.736 |
| $S_2$ | 0.200 |
| $S_4$ | 0.887 |

Next, data according to the above condition equations in the electronic camera of the present embodiment will be described. It is to be noted that the eye point E is disposed in a position of 22.3 mm from the last surface of the finder optical system toward the observer side.

| | | +1.5 | −1.0 | −3.5 |
|---|---|---|---|---|
| Diopter scale | | | | |
| ENP1 | | 70.11 | 70.11 | 70.11 |
| EPAE | | 59.66 | 59.66 | 59.66 |
| MSL | | 61.83 | 61.83 | 61.83 |
| OBJH | | 12.26 | 12.26 | 12.26 |
| EPFL | | 5645.38 | 714.28 | 385.86 |
| $\tan^{-1}$(OBJH/EPAE) | | 11.61 | 11.61 | 11.61 |
| $\tan^{-1}$(OBJH/EPFL) | | 0.12 | 0.98 | 1.82 |
| Condition Equation (4): | ENP1/EPAE | 1.175 | 1.175 | 1.175 |
| Condition Equation (5): | |EPAE − MSL| | 2.17 | 2.17 | 2.17 |
| Condition Equation (B): | $|\tan^{-1}$(OBJH/EPAE) − $\tan^{-1}$(OBJH/EPFL)| | 11.484 | 10.625 | 9.789 |

Fifth Embodiment

The present embodiment is different from the fourth embodiment in an only specific lens constitution of a secondary image forming optical system 107, and a constitution such as arrangement of members is similar to that of the fourth embodiment. Therefore, description of the similar constitution is omitted. An only specific constitution of the secondary image forming optical system will be described with reference to FIG. 17.

Figure 17:
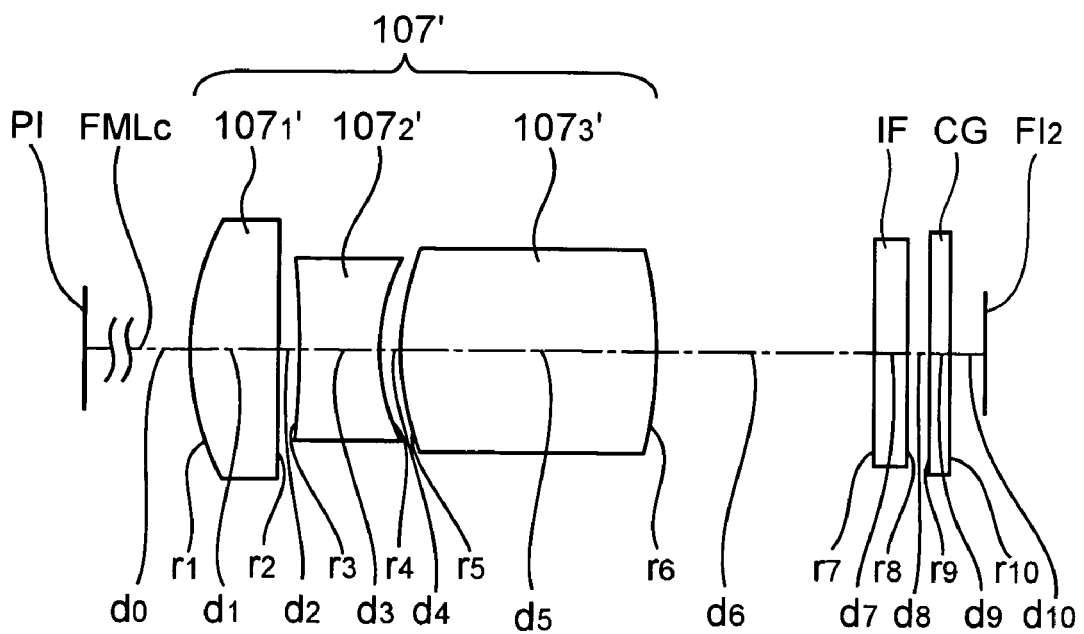
FIG. 17 is a sectional view along an optical axis, showing a constitution of a secondary image forming optical system of an electronic camera according to a fifth embodiment of the present invention.

In the present embodiment, as shown in FIG. 17, a secondary image forming optical system 107' is constituted of, in order from a primary image forming surface side, a positive meniscus lens $107_1'$ whose convex surface faces the primary image forming surface side; an aperture stop S formed integrally with an image-side surface of the positive meniscus lens $107_1'$; a double-concave negative lens $107_2'$; and a double-convex positive lens $107_3'$. It is to be noted that FMLc is an optical axis of the secondary image forming optical system, IF is an infrared cut film, CG is a cover glass, PI is the primary image forming surface of a screen mat 104 and $FI_2$ is an image pickup surface of an image sensor of a second imaging medium 108.

As numeric value data of the lenses constituting this secondary image forming optical system 107', for example, Numeric Value Data 2 of Example 2 described above are usable.

Next, data according to the above condition equations in the electronic camera of the present embodiment will be described. It is to be noted that an eye point E is disposed in a position of 22.3 mm from the last surface of a finder optical system toward an observer side.

| | | +1.5 | −1.0 | −3.5 |
|---|---|---|---|---|
| Diopter scale | | | | |
| ENP1 | | 64.34 | 64.34 | 64.34 |
| EPAE | | 59.66 | 59.66 | 59.66 |
| MSL | | 61.83 | 61.83 | 61.83 |
| OBJH | | 12.26 | 12.26 | 12.26 |
| EPFL | | 5645.38 | 714.28 | 385.86 |
| $\tan^{-1}$(OBJH/EPAE) | | 11.61 | 11.61 | 11.61 |
| $\tan^{-1}$(OBJH/EPFL) | | 0.12 | 0.98 | 1.82 |
| Condition Equation (4): | ENP1/EPAE | 1.078 | 1.078 | 1.078 |
| Condition Equation (5): | |EPAE − MSL| | 2.17 | 2.17 | 2.17 |
| Condition Equation (B): | $|\tan^{-1}$(OBJH/EPAE) − $\tan^{-1}$(OBJH/EPFL)| | 11.484 | 10.625 | 9.789 |

Sixth Embodiment

The present embodiment is different from the fourth and fifth embodiments in an only specific lens constitution of a secondary image forming optical system 107, and a constitution such as arrangement of members is similar to those of the fourth and fifth embodiment. Therefore, description of the similar constitution is omitted. An only specific constitution of the secondary image forming optical system will be described with reference to FIG. 18.

Figure 18:
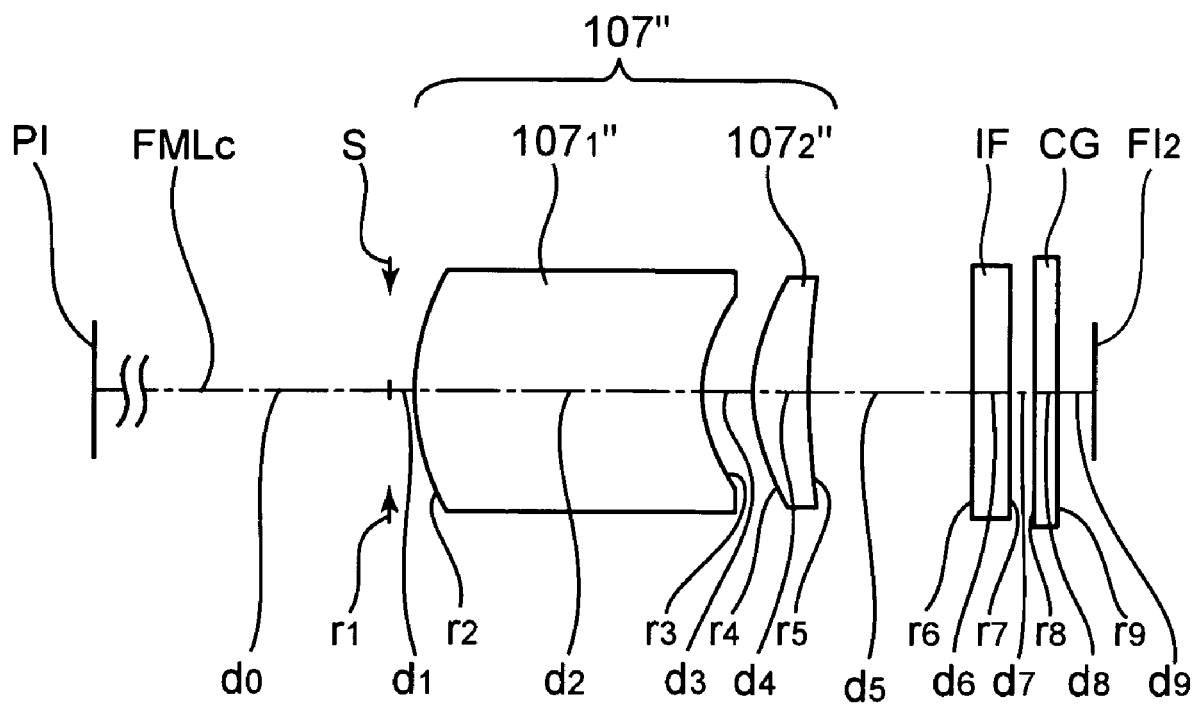
FIG. 18 is a sectional view along an optical axis, showing a constitution of a secondary image forming optical system of an electronic camera according to a sixth embodiment of the present invention.

In the present embodiment, as shown in FIG. 18, a secondary image forming optical system 107″ is constituted of, in order from a primary image forming surface side, an aperture stop S; a positive meniscus lens $107_1$″ whose convex surface faces the primary image forming surface side and whose surface on the primary image forming surface side is an aspherical surface; and a positive meniscus lens $107_2$″ whose convex surface faces the primary image forming surface side and whose opposite surfaces are aspherical surfaces. It is to be noted that FMLc is an optical axis of the secondary image forming optical system, IF is an infrared cut film, CG is a cover glass, PI is the primary image forming surface of a screen mat 104 and $FI_2$ is an image pickup surface of an image sensor of a second imaging medium 108.

Next, numeric value data of the lenses constituting the secondary image forming optical system 107″ will be described.

Numeric Value Data 6: Secondary Image Forming Optical System (Secondary Image Forming Optical System 107″)

| | f = 9.96 mm<br>F-number = 2.80 | | | |
|---|---|---|---|---|
| $S_0$ | $r_0 = \infty$(PI) | $d_0 = 64.00$ | | |
| $S_1$ | $r_1 = \infty$(S) | $d_1 = 0.50$ | | |
| $S_2$ | $r_2 = 4.082$(AS) | $d_2 = 6.00$ | $n_{d2} = 1.52542$ | $\nu_{d2} = 55.78$ |
| $S_3$ | $r_3 = 2.927$ | $d_3 = 1.00$ | | |
| $S_4$ | $r_4 = 3.137$(AS) | $d_4 = 1.20$ | $n_{d4} = 1.52542$ | $\nu_{d4} = 55.78$ |
| $S_5$ | $r_5 = 12.169$(AS) | $d_5 = 3.40$ | | |
| $S_6$ | $r_6 = \infty$ | $d_6 = 0.75$ | $n_{d6} = 1.51633$ | $\nu_{d6} = 64.14$ |
| $S_7$ | $r_7 = \infty$ | $d_7 = 0.50$ | | |
| $S_8$ | $r_8 = \infty$ | $d_8 = 0.50$ | $n_{d8} = 1.51633$ | $\nu_{d8} = 64.14$ |
| $S_9$ | $r_9 = \infty$ | $d_7 = 0.71$ | | |
| $S_{10}$ | $r_{10} = \infty$($FI_2$) | | | |

Aspherical Surface Coefficient

2nd surface ($S_2$)

R = 4.0815  K = −0.3784
A = 0.0000 × 10⁰  B = 0.0000 × 10⁰  C = 0.0000 × 10⁰
D = 0.0000 × 10⁰  E = 0.0000 × 10⁰

4th surface ($S_4$)

R = 3.1372  K = −0.7595
A = 0.0000 × 10⁰  B = 0.0000 × 10⁰  C = 0.0000 × 10⁰
D = 0.0000 × 10⁰  E = 0.0000 × 10⁰

5th surface ($S_5$)

R = 12.169  K = 8.7922
A = 0.0000 × 10⁰  B = 0.0000 × 10⁰  C = 0.0000 × 10⁰
D = 0.0000 × 10⁰  E = 0.0000 × 10⁰

Next, data according to the above condition equations in the electronic camera of the present embodiment will be described. It is to be noted that an eye point E is disposed in a position of 22.3 mm from the last surface of a finder optical system toward an observer side.

| Diopter scale | +1.5 | −1.0 | −3.5 |
|---|---|---|---|
| ENP1 | 64.00 | 64.00 | 64.00 |
| EPAE | 59.66 | 59.66 | 59.66 |
| MSL | 61.83 | 61.83 | 61.83 |
| OBJH | 12.26 | 12.26 | 12.26 |
| EPFL | 5645.38 | 714.28 | 385.86 |
| $\tan^{-1}$(OBJH/EPAE) | 11.61 | 11.61 | 11.61 |
| $\tan^{-1}$(OBJH/EPFL) | 0.12 | 0.98 | 1.82 |
| Condition Equation (4): ENP1/EPAE | 1.073 | 1.073 | 1.073 |
| Condition Equation (5): |EPAE − MSL| | 2.17 | 2.17 | 2.17 |
| Condition Equation (B): $|\tan^{-1}$(OBJH/EPAE) − $\tan^{-1}$(OBJH/EPFL)| | 11.484 | 10.625 | 9.789 |

Seventh Embodiment

It is to be noted that an electronic camera of the present invention may be constituted as follows in addition to a constitution shown in FIG. 13 of the above embodiments.

Figure 19:
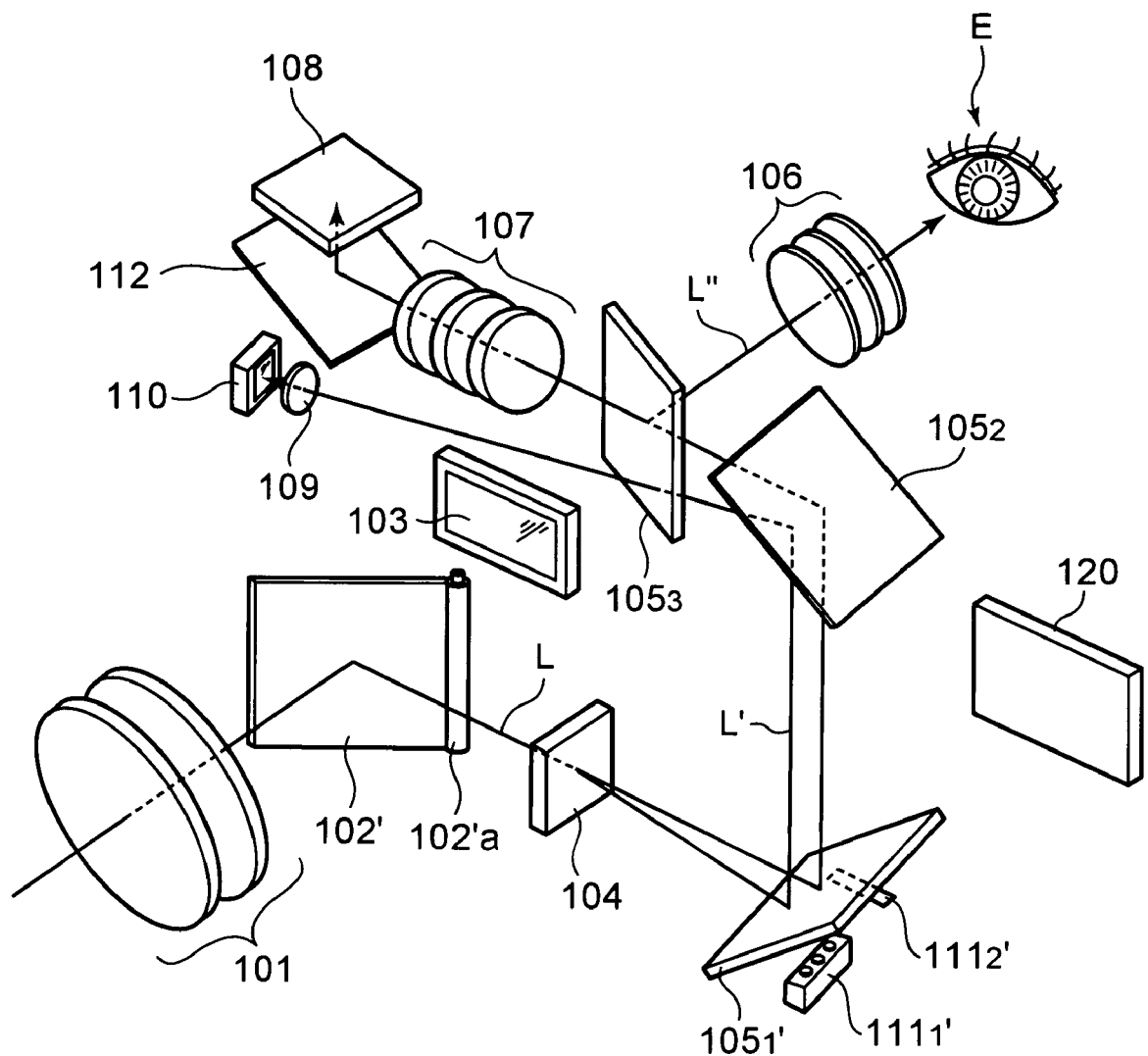
FIG. 19 is a schematic constitution diagram showing an arrangement constitution of optical members during subject observation of an electronic camera according to a seventh embodiment of the present invention.
Figure 20:
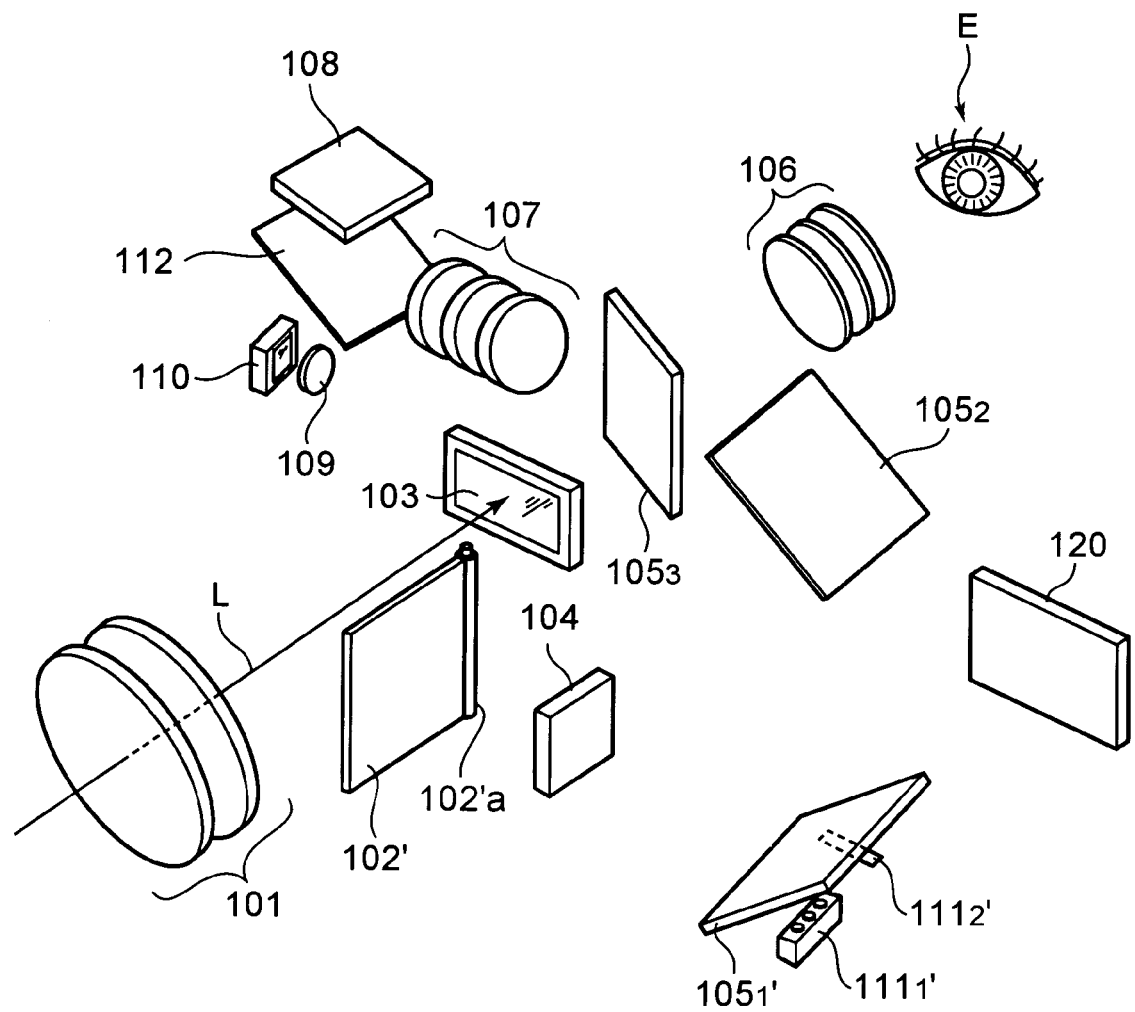
FIG. 20 is a schematic constitution diagram showing an arrangement constitution of the optical members during subject photographing of the electronic camera according to the seventh embodiment of the present invention.

FIGS. 19 and 20 show separate constitution examples of the camera of the present invention, FIG. 19 is a schematic constitution diagram showing an arrangement constitution of optical members during subject observation, and FIG. 20 is a schematic constitution diagram showing an arrangement constitution of the optical members during subject photographing.

The arrangement constitution of the optical members in this seventh embodiment is common to that of optical members described above with reference to FIG. 13 in many respects. Therefore, an only different part will be described hereinafter in detail.

In this seventh embodiment, a quick return mirror 102′ is an optical path branching member, and disposed so as to be rotatable around a shaft 102′a along an optical path of a subject light flux L emitted from a photographing lens system 101. During the subject observation, this quick return mirror 102′ changes an optical path of the subject light flux L to guide the flux to a finder optical system. Moreover, in this state, the photographing using a second imaging medium is also possible. On the other hand, during the photographing using the first imaging medium, the quick return mirror 102′ is rotated around the shaft 102′a to a position shown in FIG. 20 by a driving mechanism (not shown) to retreat from the optical path of the subject light flux L, and the subject light flux L is guided to a first imaging medium 103 constituted of an image sensor such as a CCD or a photosensitive recording medium such as a silver salt film.

Moreover, in this seventh embodiment, the finder optical system is constituted of three reflective members including, in order from a primary image forming surface side, a half mirror $105_1$ which is a first reflective member; a mirror $105_2$ which is a second reflective member; and a half mirror $105_3$ which is a third reflective member. A displaying member $111_1$′ and a focal displaying member $111_2$′ are arranged on a side opposite to a reflective surface of the half mirror $105_1$′ as the first reflective member along an extension of the optical path of the subject light flux L reflected by the half mirror $105_1$′ which is the first reflective member.

As described above, when members having a light transmitting characteristic are used in two of the reflective members of the finder optical system, a second imaging medium 108, a photometry member 110, the displaying member $111_1$′ and the focal displaying member $111_2$′ can compactly be arranged.

Furthermore, the displaying member $111_1$′ and the focal displaying member $111_2$′ are arranged on the side opposite to the reflective surface of the half mirror $105_1$′ which is the first reflective member along the extension of the optical path of the light flux L reflected by the half mirror $105_1$′. Therefore, a distance from subject image data formed on the primary image forming surface in the finder optical system to an eye point E or the second imaging medium 108 is substantially equal to a distance from the displaying member $111_1'$ or the focal displaying member $111_2'$ to the eye point E or the second imaging medium 108. Therefore, focusing can simultaneously be performed along both of the distances. A space present on the side opposite to the reflective surface of the half mirror $105_1'$ can effectively be used, and the camera can be miniaturized. At this time, it is further preferable that in a light quantity distribution of the reflective surface of the half mirror $105_1'$ as the first reflective member, a reflection factor satisfies the following condition equation (6):

$$60\% \leq \text{the reflective surface of the first reflective member} \leq 90\% \quad (6).$$

Moreover, in this seventh embodiment, during the subject observation, a subject light flux L' is split from the subject light flux L transmitted through a screen mat 104 which is a screen mat for the primary image forming surface. These light fluxes pass through the half mirror $105_3$, the subject light flux L further passes through a secondary image forming optical system 107 and is guided to a second image sensor, and the subject light flux L' passes through a photometry optical system 109 and is guided to the photometry member 110. It is to be noted that a subject light flux L″ split and reflected by the half mirror $105_3$ is guided to an eyepiece lens system 106.

Since an incidence pupil position of the second imaging medium 108 is substantially the same as that of the photometry member 110, it is preferable that one of them is disposed in the vicinity of the other as in this seventh embodiment. According to such an arrangement, the second imaging medium 108 and the photometry member 110 can compactly be arranged. Furthermore, at this time, it is preferable that the light quantity distribution of the reflective surface of the half mirror $105_3$ which is the third reflective member satisfies the following condition equation (7):

$$40\% \leq \text{the reflective surface of the third reflective member} \leq 70\% \quad (7).$$

It is to be noted that at this time, it is further preferable that in the light quantity distribution of the reflective surfaces of the half mirror $105_1'$ which is the first reflective member and the half mirror $105_3$ which is the third reflective member, reflection factors satisfy the following condition equations (6') and (7'), respectively:

$$80\% \leq \text{the reflective surface of the first reflective member} \leq 90\% \quad (6'); \text{ and}$$

$$40\% \leq \text{the reflective surface of the third reflective member} \leq 60\% \quad (7').$$

Furthermore, in the light quantity distribution of the reflective surfaces of the half mirror $105_1'$ which is the first reflective member and the half mirror $105_3$ which is the third reflective member, the reflection factors are set to ranges of following condition equations (6') and (7'), respectively. In consequence, it is possible to keep an appropriate light quantity balance among the finder optical system, the second imaging medium, the photometry member, the displaying member and the focal displaying member.

It is to be noted that in the seventh embodiment, a mirror 112 is disposed between the secondary image forming optical system 107 and the second imaging medium 108.

According to such an arrangement, compact arrangement is possible. Since the image sensor 102 is brought close to a body frame (not shown) of the camera, the body frame can be removed to easily adjust the image sensor 102.

Eighth Embodiment

Figure 21:
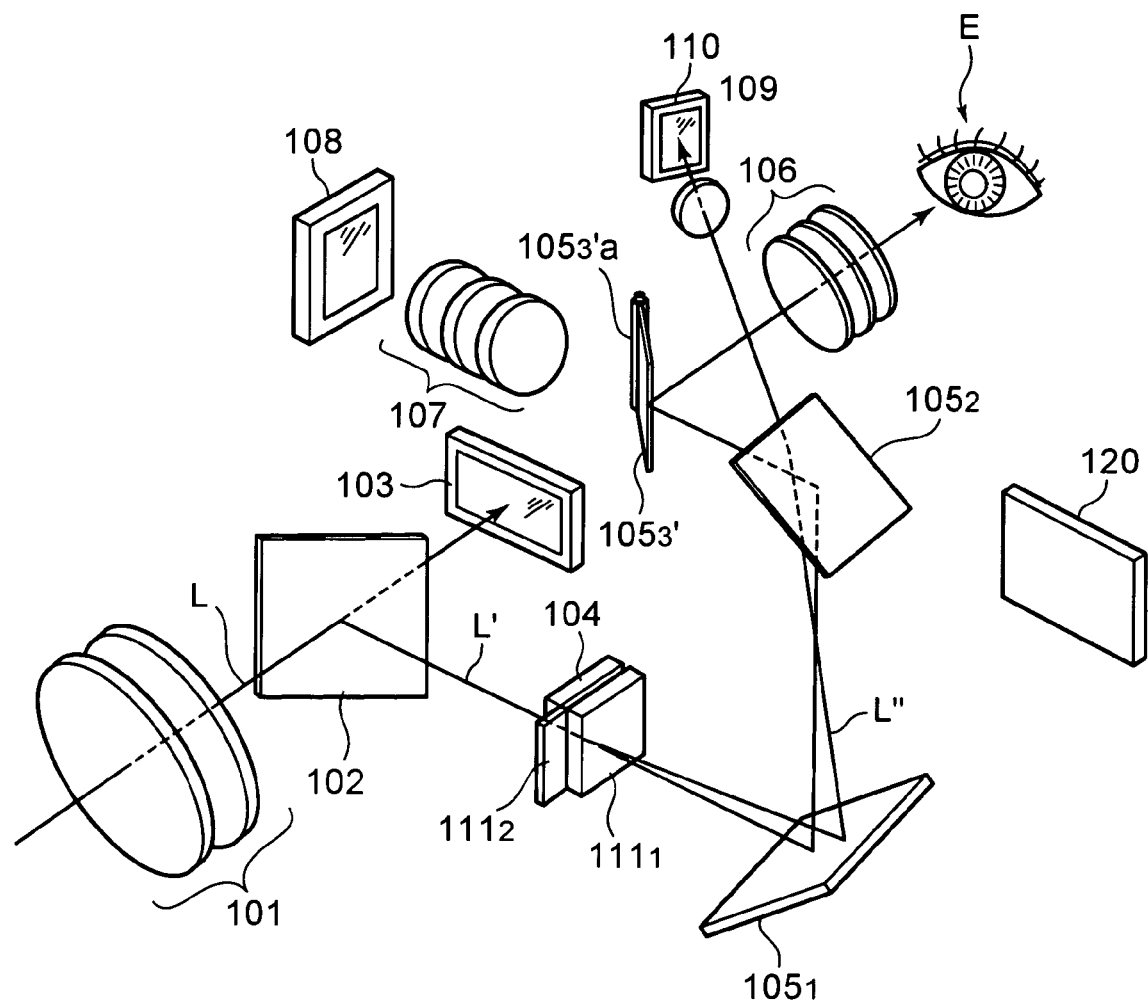
FIG. 21 is a schematic constitution diagram showing an arrangement constitution of optical members during subject observation of an electronic camera according to an eighth embodiment of the present invention.
Figure 22:
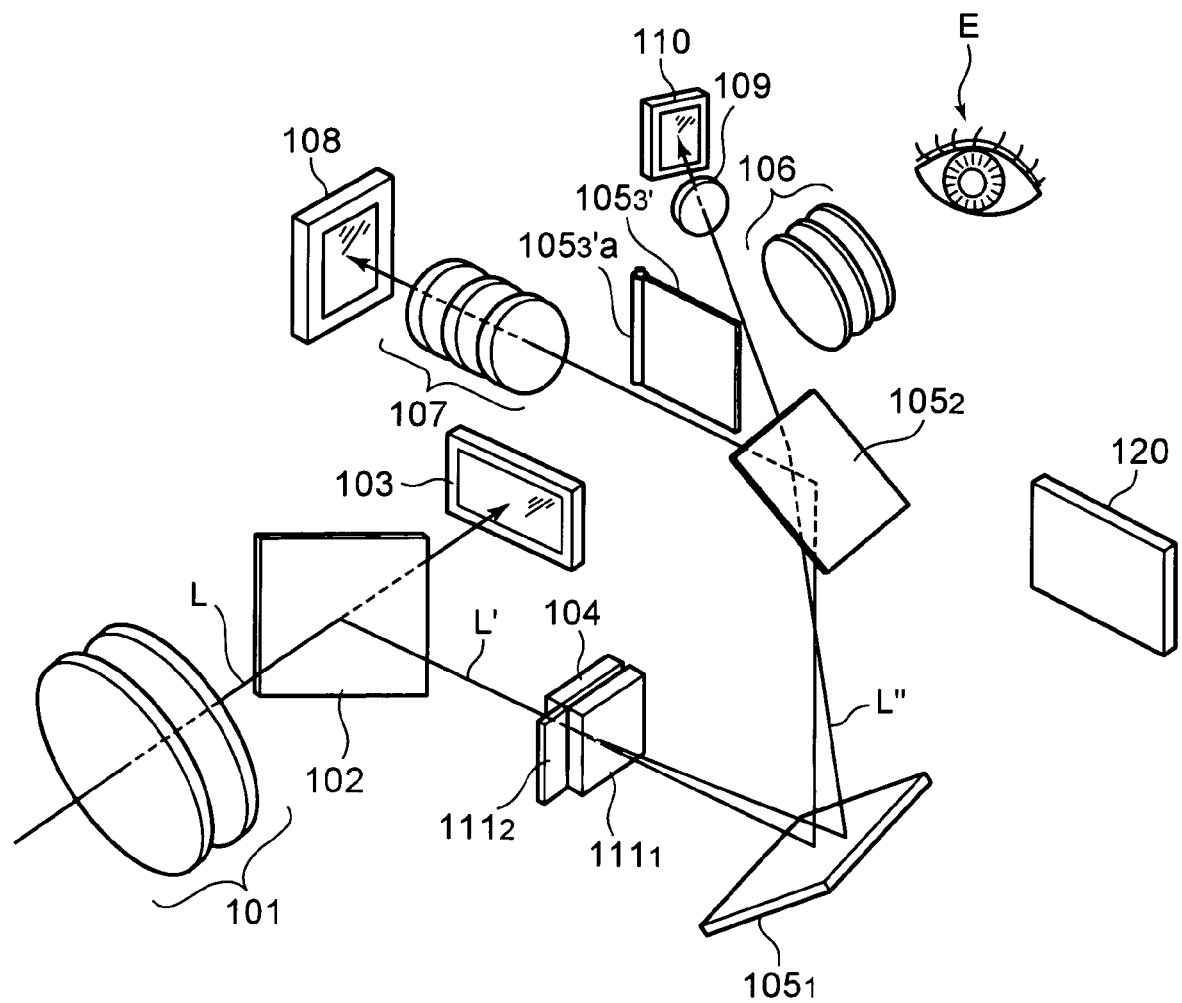
FIG. 22 is a schematic constitution diagram showing an arrangement constitution of the optical members during subject photographing of the electronic camera according to the eighth embodiment of the present invention.

FIGS. 21 and 22 show an eighth embodiment of an electronic camera of the present invention, FIG. 21 is a schematic constitution diagram showing an arrangement constitution of optical members during subject observation, and FIG. 22 is a schematic constitution diagram showing an arrangement constitution of the optical members during subject photographing.

The arrangement constitution of the optical members in this eighth embodiment is common to that of the optical members described above with reference to FIG. 13 in many respects. Therefore, an only different part will be described hereinafter in detail.

In this eighth embodiment, a third reflective member of a finder optical system is constituted of a quick return mirror $105_3'$, and disposed so as to be rotatable around a shaft $105_3'a$ along an optical path of a subject light flux L' split from a subject light flux L by a half mirror 102 which is an optical path branching member. During the subject observation, this quick return mirror $105_3'$ guides the subject light flux L' to an eyepiece lens system. On the other hand, during subject photographing or the subject observation using a subject image display member 120, the quick return mirror $105_3'$ is rotated around the shaft $105_3'a$ to a position shown in FIG. 22 by a driving mechanism (not shown) to retreat from an optical path of the subject light flux L', and the subject light flux L' is therefore guided to a second imaging medium 108 constituted of an image sensor such as a CCD.

According to such a constitution, a light quantity does not drop in the finder optical system and the second imaging medium 108, and it is possible to easily secure brightness sufficient for the observation. The subject light flux L is inverted by a photographing lens system 101, but can be changed to an erected image via a reflective surface of the half mirror 102 and reflective surfaces of three reflective members of the finder optical system, that is, four reflective surfaces. It is to be noted that since the subject light flux L' guided to the second imaging medium 108 is reflected via the reflective surface of the half mirror 102 and the reflective surfaces of two of the reflective members of the finder optical system, that is, three reflective surfaces only, the flux remains to be inverted. However, when output information from the second imaging medium 108 is displayed in the subject image display member 120, the image is inverted into the erected image together with another image processing.

It is to be noted that in the eighth embodiment, during the subject photographing or the subject observation via the subject image display member 120, a displaying member and a focal displaying member may be turned off.

Moreover, in three electronic cameras constituted as described above, the screen mat 104 as the screen mat for the primary image forming surface may be provided with a diffusing function or a transmitting function by use of a plain plate (e.g., having no or little diffusion property).

As described above, when the screen mat 104 as the screen mat for the primary image forming surface is provided with the diffusing function, allowable amounts of NA of the photographing lens and an emission pupil position can preferably be increased as compared with a conventional technology.

Moreover, in the three electronic cameras constituted as described above, at least one of a surface having a condensing function or a mat surface may be disposed in the vicinity of the screen mat 104 as a primary image forming member so that the surface is parallel to the primary image forming surface.

When the surface (e.g., a Fresnel lens surface or the like) having the condensing function is disposed in parallel with the primary image forming surface on or in the vicinity of this primary image forming surface, aberration fluctuations of the subject light flux can be minimized. When the subject light flux is refracted by a condenser lens so as to be directed to the incidence pupils of the finder optical system and the secondary image forming optical system, shading of a ray or a remarkable drop of a peripheral light quantity can be prevented from being generated in a screen peripheral portion of image data acquired by the finder and the second imaging medium.

When the mat surface is disposed in parallel with the primary image forming surface on or in the vicinity of the primary image forming surface, deterioration of the subject image due to diffusion of the subject light flux can be minimized. When the subject light flux is refracted so as to be directed to the incidence pupils of the finder optical system and the secondary image forming optical system owing to the diffusion of the mat surface, the shading of the rays or the remarkable drop of the peripheral light quantity can be prevented from being generated in the screen peripheral portion of the image data acquired by the finder and the second imaging medium. It is to be noted that it is preferable to dispose the mat surface in a position optically equivalent to that of the image pickup surface of the first imaging medium as viewed from the subject.

Moreover, in the three electronic cameras constituted as described above, any low pass filter may not be used in the second imaging medium 108.

When any low pass filter is not used, the arrangement relation can be provided with a margin, and further cost reduction is also possible. At this time, a necessary low pass effect may be obtained by a method of imparting the diffusing function to the primary image forming surface to displace the surface from a conjugate position, imparting the low pass effect to the diffusing function of the primary image forming surface or obtaining the low pass effect by an image forming performance of the secondary image forming optical system. It is to be noted that when the low pass effect is obtained by the image forming performance of the secondary image forming optical system, any diffusing function may not be imparted to the primary image forming surface.

Furthermore, in the three electronic cameras constituted as described above, the image sensor of the second imaging medium 108 may be used as the image sensor of the photometry member 110.

In addition, in the three electronic cameras constituted as described above, a prism may be used as the reflective member.

The second imaging medium can also serve as the photometry member, and it is possible to simultaneously acquire data of the subject image itself and data indicating an image state such as brightness.

The above electronic cameras of the present invention can be constituted, for example, as follows in addition to description of claims.

(1) The camera according to claim 1, further comprising:
a displaying member; and
a focal displaying member.

(2) The camera according to claim 1, further comprising:
a finder optical system disposed in an optical path in a direction different from that of the first imaging medium,
the finder optical system including, in order from a primary image forming surface side, at least a first reflective member, a second reflective member and a third reflective member on an image side of the primary image forming surface forming member,
at least the first reflective member and the third reflective member having a light-transmitting characteristic.

(3) The camera according to claim 1, further comprising:
a finder optical system disposed in an optical path in a direction different from that of the first imaging medium,
the finder optical system including, in order from a primary image forming surface side, at least a first reflective member, a second reflective member and a third reflective member on an image side of the primary image forming surface forming member,
at least the first reflective member having a light transmitting property,
the camera further comprising:
a displaying member and a focal displaying member on a side opposite to a reflective surface of the first reflective member in an extension of an optical path of a light flux reflected by the first reflective member.

(4) The camera according to claim 1, further comprising:
a finder optical system disposed in an optical path in a direction different from that of the first imaging medium,
the finder optical system including, in order from a primary image forming surface side, at least a first reflective member, a second reflective member and a third reflective member on an image side of the primary image forming surface forming member,
at least the third reflective member having a light transmitting property, the second imaging medium and the photometry member being provided in an optical path of a light flux transmitted through the third reflective member.

(5) The camera according to claim 1, further comprising:
a finder optical system disposed in an optical path in a direction different from that of the first imaging medium,
the finder optical system including, in order from a primary image forming surface side, at least a first reflective member, a second reflective member and a third reflective member on an image side of the primary image forming surface forming member,
at least the first reflective member and the third reflective member having a light transmitting property,
the camera further comprising:
a displaying member and a focal state displaying member on a side opposite to a reflective surface of the first reflective member in an extension of an optical path of a light flux reflected by the first reflective member,
the second imaging medium and the photometry member being provided in an optical path of a light flux transmitted through the third reflective member,
in a light quantity distribution of the reflective surfaces of the first reflective member and a reflective surface of the third reflective member, the following condition equations being satisfied by reflection factors:

$80\% \leq$ the reflective surface of the first reflective member $\leq 90\%$; and $40\% \leq$ the reflective surface of the third reflective member $\leq 60\%$.

(6) The camera according to claim 1, further comprising:
a subject image display member capable of displaying subject image data acquired by at least one of the first imaging medium and the second imaging medium, the second imaging medium being configured to acquire the subject image data in a region smaller than an effective region of the image sensor, the subject image display member being configured to cut out and display data having a region further smaller than that of the subject image display member.

(7) The camera according to claim 1, wherein an effective region of the image sensor of the second imaging medium is broader than a region in which a subject image formed on the primary image forming surface is projected onto the image sensor of the second imaging medium.

(8) The camera according to claim 1, wherein the second imaging medium performs processing to acquire subject image display member, add up a plurality of pixel data of the subject image display member and form one pixel data.

(9) The camera according to claim 1, wherein any low pass filter is not used in the second imaging medium.

(10) The camera according to claim 1, wherein the image sensor of the second imaging medium also serves as an image sensor of the photometry member.

(11) The camera according to claim 1, further comprising:
a finder optical system disposed in an optical path branched by the optical path branching member and having a plurality of reflective members, the second imaging medium being disposed on a side opposite to a reflective surface of the reflective member having the largest paraxial distance from the primary image forming surface.

(12) The camera according to claim 1, further comprising:
a finder optical system disposed in an optical path branched by the optical path branching member and having a plurality of reflective members, the reflective member having the largest paraxial distance from the primary image forming surface being provided with a light transmitting property, the second imaging medium being disposed in an optical path of a light flux transmitted through the reflective member.

(13) The camera according to claim 1, further comprising:
a finder optical system disposed in an optical path branched by the optical path branching member and having a plurality of reflective members, the reflective member having the largest paraxial distance from the primary image forming surface being a movable mirror which is movable forwards and backwards with respect to the optical path of the finder optical system, during retreating of the movable mirror, a subject image formed on the primary image forming surface being guided to the second imaging medium.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A camera comprising:
a first imaging medium which acquires subject image data from a subject light flux transmitted through a photographing lens;
an optical path branching member which is disposed in an image pickup optical path of the first imaging medium to branch an optical path of the subject light flux;
a primary image forming surface on which the subject light flux branched by the optical path branching member forms an image;
a second imaging medium which picks up the subject image formed on the primary image forming surface; and
a secondary image forming optical system which projects the subject image formed on the primary image forming surface onto the second imaging medium,
wherein the following conditions 1 is satisfied:
Condition 1: the camera has a finder optical system which is disposed in an optical path in a direction different from that of the first imaging medium and through which the subject image formed on the primary image forming surface is observed, and the camera satisfies the following equation (1):

$$|TAN^{-1}(OBJH/ENP1)-TAN^{-1}(OBJH/ENP2)|\leq 20° \quad (1),$$

in which ENP1 is a distance from the incidence pupil of the secondary image forming optical system to the subject image formed on the primary image forming surface along the optical axis, and ENP2 is a distance from the incidence pupil of the finder optical system to the subject image formed on the primary image forming surface along the optical axis, wherein it is set that an eye point of the finder optical system is disposed at an arbitrary position in a range of 0 to 50 mm from the last surface of the finder optical system toward an observation side, and OBJH is the maximum effective ray height on the primary image forming surface.

2. The camera according to claim 1, wherein the secondary image forming optical system includes at least one or more plastic lenses.

3. The camera according to claim 1, wherein the secondary image forming optical system includes at least one or more aspherical lenses.

4. The camera according to claim 1, wherein an image sensor for use in the second imaging medium is smaller in size than an image sensor for use in the first imaging medium.

5. The camera according to claim 1, further comprising:
a photographing information display member and a focused portion display member as a part of common optical members constituting the finder optical system and the secondary image forming optical system.

6. The camera according to claim 1, wherein a surface having a condensing function is disposed in parallel with the primary image forming surface in the vicinity of the primary image forming surface.

7. The camera according to claim 6, further comprising:
the finder optical system, wherein the following condition equation is satisfied:

$$|TAN^{-1}(OBJH/ENP1)-TAN^{-1}(OBJH/ENP2)|\leq 15°,$$

in which ENP1 is a distance from the incidence pupil of the secondary image forming optical system to the subject image formed on the primary image forming surface along the optical axis, and ENP2 is a distance from the incidence pupil of the finder optical system to the subject image formed on the primary image forming surface along the optical axis;

wherein it is set that the eye point of the finder optical system has an arbitrary value in a range of 0 to 50 mm from the last surface of the finder optical system toward the observation side; and OBJH is the maximum effective ray height on the primary image forming surface.

8. The camera according to claim 1, wherein the secondary image forming optical system includes a plurality of optical reflective surfaces.

9. The camera according to claim 8, wherein some of the plurality of optical reflective surfaces have a light transmitting property.

10. The camera according to claim 1, wherein a mat surface is disposed in parallel with the primary image forming surface in the vicinity of the primary image forming surface.

11. The camera according to claim 1, wherein the following condition 2 is satisfied:

Condition 2: the secondary image forming optical system has at least one positive lens, one negative lens, and the camera satisfies the following equation (2):

$$10 \leq vp - vn \qquad (2),$$

in which vp is the Abbe number in a d-line of the positive lens among the lenses constituting the secondary image forming optical system, and C is the Abbe number in a d-line of the negative lens among the lenses constituting the secondary image forming optical system.

12. The camera according to claim 1, wherein the following condition 3 is satisfied:

Condition 3: the secondary image forming optical system has at least two positive lenses, and the camera satisfies the following equation (3):

$$50 \leq vpmx \qquad (3),$$

in which vpmx is the Abbe number in the d-line of the positive lens having the largest power among the lenses constituting the secondary image forming optical system.

13. The camera according to claim 1, wherein the following condition 4 is satisfied:

Condition 4: the camera has: a photometry member. which detects brightness of the subject image formed on the primary image forming surface; and a photometry optical system which guides, to the photometry member, a light flux emitted from the subject image formed on the primary image forming surface, and the camera satisfies the following equation (4):

$$0.5 \leq ENP1/EPAE \leq 1.7 \qquad (4),$$

in which ENP1 is a distance from the primary image forming surface to the incidence pupil of the secondary image forming optical system, and EPAE is a distance from the primary forming to an incidence pupil, of the photometry optical system.

14. The camera according to claim 1, wherein the following condition 5 is satisfied:

Condition 5: the camera has: a photometry member which detects brightness of the subject image formed on the primary image forming surface; and a photometry optical system which guides, to the photometry member, a light flux emitted from the subject image formed on the primary image forming surface, the finder optical system has a plurality of reflective members, and the camera satisfies the following equation (5):

$$|EPAE - MSL| \leq 20 \qquad (5),$$

in which EPAE is a distance from the primary image forming surface to the incidence pupil of the photometry optical system, and MSL is a distance from, the primary image forming surface to a reflective surface of the reflective member having the largest paraxial distance from the primary image forming surface.

15. A camera comprising:

a first imaging medium which acquires subject image data from a subject light flux transmitted through a photographing lens;

a first optical path branching member which is disposed in an image pickup optical path of the first imaging medium to branch an optical path of the subject light flux;

a primary image forming surface on which the subject light flux branched by the first optical path branching member forms an image;

a second imaging medium which picks up the subject image formed on the primary image forming surface; and a secondary image forming optical system which projects the subject image formed on the primary image forming surface onto the second imaging medium, wherein the camera further comprises:

a second optical path branching member which is disposed between the primary image forming surface and the secondary image forming optical system; and an eyepiece lens system which is disposed in an optical path in a direction different from that of the second imaging medium and through which the subject image formed on the primary image forming surface is observed, wherein the second optical path branching member is disposed between the primary image forming surface and the eyepiece lens system, and the second optical path branching member is disposed so as to be rotatable to branch an optical path and the second optical path branching member has an optical reflective surface which reflects the optical path to the eyepiece lens system side.

16. The camera according to claim 15, wherein the second optical path branching member is rotated to retreat from the optical path.

* * * * *